United States Patent
Hata et al.

(10) Patent No.: US 11,983,411 B2
(45) Date of Patent: May 14, 2024

(54) METHODS, DEVICES AND SYSTEMS FOR INCLUDING ALTERNATE MEMORY ACCESS OPERATIONS OVER MEMORY INTERFACE

(71) Applicant: Infineon Technologies LLC, San Jose, CA (US)

(72) Inventors: Nobuaki Hata, Tokyo (JP); Clifford Zitlaw, San Jose, CA (US); Yuichi Ise, Kanagawa (JP); Stephan Rosner, Campbell, CA (US)

(73) Assignee: Infineon Technologies LLC, San Jose, CA (US)

( * ) Notice: Subject to any disclaimer, the term of this patent is extended or adjusted under 35 U.S.C. 154(b) by 23 days.

(21) Appl. No.: 17/728,783

(22) Filed: Apr. 25, 2022

(65) Prior Publication Data
US 2023/0342034 A1 Oct. 26, 2023

(51) Int. Cl.
*G06F 3/06* (2006.01)
*G06F 12/02* (2006.01)

(52) U.S. Cl.
CPC .......... *G06F 3/0611* (2013.01); *G06F 3/0634* (2013.01); *G06F 3/0659* (2013.01); *G06F 3/0673* (2013.01); *G06F 12/0284* (2013.01); *G06F 2212/1024* (2013.01)

(58) Field of Classification Search
None
See application file for complete search history.

(56) References Cited

U.S. PATENT DOCUMENTS

| | | | |
|---|---|---|---|
| 6,697,917 B1* | 2/2004 | Matsushima | G06F 12/0891 711/135 |
| 2006/0039223 A1* | 2/2006 | Higashiho | G11C 11/40603 365/222 |
| 2009/0138234 A1 | 5/2009 | Sundman et al. | |
| 2009/0196102 A1* | 8/2009 | Kim | G11C 7/1045 365/185.11 |
| 2010/0281227 A1* | 11/2010 | Walker | G06F 13/1668 711/149 |

(Continued)

FOREIGN PATENT DOCUMENTS

CN 108958647 A 12/2018

OTHER PUBLICATIONS

Taiwan Office Action from Application 112110063 dated Feb. 26, 2024; 18 pages.

*Primary Examiner* — Stephanie Wu

(57) ABSTRACT

A method can include, in a default mode of a memory device, decoding command data received on a unidirectional command address (CA) bus of a memory interface according to a first standard. In response to decoding a mode enter command, placing the memory device into an alternate management mode. In the alternate management mode, receiving alternate command data on the CA bus, and in response to receiving a command execute indication on the CA bus, decoding alternate command data according to a second standard to execute an alternate command. In response to decoding a mode exit command received on the CA bus according to the first standard, returning the memory device to the default mode. The memory interface comprises the CA bus and a data bus, and the CA bus and data bus comprise a plurality of parallel input connections. Corresponding devices and systems are also disclosed.

20 Claims, 21 Drawing Sheets

(56) References Cited

U.S. PATENT DOCUMENTS

| | | |
|---|---|---|
| 2018/0335980 A1 | 11/2018 | Chang et al. |
| 2019/0138234 A1* | 5/2019 | Brandl .................. G06F 3/0604 |
| 2021/0280224 A1* | 9/2021 | Murphy ............... G11C 7/1045 |

* cited by examiner

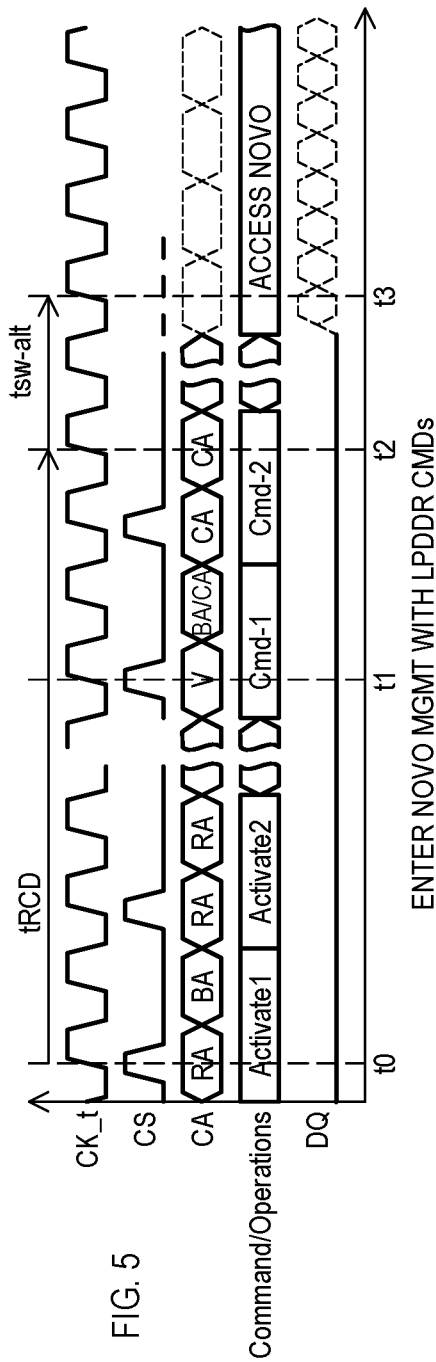

|       | CS | CA0 | CA1 | CA2 | CA3 | CA4 | CA5 |
|-------|----|-----|-----|-----|-----|-----|-----|
| MPC-1 | H  | L   | L   | L   | L   | L   | Op6 |
|       | L  | Op0 | Op1 | Op2 | Op3 | Op4 | Op5 |
| MPC-2 | H  | L   | H   | L   | H   | L   | V   |
|       | L  | V   | V   | V   | V   | V   | V   |

FIG. 6E

|            | CS | CA0 | CA1 | CA2 | CA3 | CA4 | CA5 |
|------------|----|-----|-----|-----|-----|-----|-----|
| MGMT Mode(s) | H  | L   | L   | H   | H   | H   | V   |
|            | L  | V   | V   | V   | V   | V   | V   |
| MGMT Mode(s) | H  | L   | H   | L   | H   | L   | V   |
|            | L  | V   | V   | V   | V   | V   | V   |
| MGMT Mode(s) | H  | L   | H   | L   | H   | H   | V   |
|            | L  | V   | V   | V   | V   | V   | V   |
| MGMT Mode(s) | H  | L   | H   | H   | H   | H   | V   |
|            | L  | V   | V   | V   | V   | V   | V   |

FIG. 7

(BACKGROUND)

METHODS, DEVICES AND SYSTEMS FOR INCLUDING ALTERNATE MEMORY ACCESS OPERATIONS OVER MEMORY INTERFACE

TECHNICAL FIELD

The present disclosure relates generally to memory devices and systems, and more particular to memory devices and systems having a command-address bus and data bus.

BACKGROUND

Some memory device applications have a need for both nonvolatility as well as fast access speeds, particularly read accesses. While fast interfaces exist, such as that set forth in the JEDEC standard JESD209-4D (i.e., LPDDR4), such interfaces do not support many nonvolatile memory (NVM) operations. To address such needs, memory devices can include two interfaces. As but one example, conventional NVM devices can include a well-established NVM serial interface (e.g., Serial Peripheral Interface, SPI) in addition to a LPDDR4 compatible interface. Such dual interface devices can enable fast read operations via the LPDDR4 interface, while also enabling NVM operations over the SPI interface (e.g., program, erase, read, Serial Flash Discovery Protocol (SFDP) register access, Secure Silicon Register (SSR) access).

The JEDEC standard JESD209-2F (i.e., LPDDR2) includes the capability enabling "Overlay Windows" which can use memory addresses that overlap existing array regions to target registers in the memory device. Thus, when write data is written to such overlay windows the write data can be redirected to mode registers, for example. However, write operations on LPDDR2/4 interfaces require read/write training prior to read or write operations. Such read/write training can include write training. Write training requires a certain amount of time (e.g., >200 ms). Such a write training time commitment is not compatible with applications where a bus is required to be available within a relatively short time period. As but two of many possible examples, some versions of the Controller Area Network (CAN) bus can require a bus be operational within 50 ms, and some IEEE 802.11 standards (i.e., Ethernet) can require a bus be operational in less than 200 ms. Thus, if there is a need to initially read or write (e.g., programmed) data into a memory device in a relatively short amount of time, a conventional LPDDR4 only device is not suitable.

While dual interface memory devices (e.g., LPDDR2/4 and SPI) can meet such fast boot requirements, such memory devices are not without drawbacks. Systems with a host and a dual interface memory device must include two buses, two controllers, and two memory mappings. Two buses can require more interface pins than a single interface memory device. Two controllers can require valuable device area to accommodate the logic circuits, as well as two separate software stacks to execute commands received over the different interfaces (i.e., commands of two different standards). Two memory mappings can arise as command-address formats can vary between the two standards.

It would be desirable to arrive at some way of providing a memory device with a fast interface speed, while at the same time meeting fast initial response (i.e., boot) system needs.

SUMMARY

Embodiments can include a memory device with an interface and memory controller circuits. An interface can include a unidirectional command address (CA) bus and a data bus. Memory controller circuits can have a default mode of operation in which command data received on the CA bus and decoded according to a first standard. In response to decoding a mode enter command, the memory device can be placed into an alternate management mode. In the alternate management mode, alternate command data can be received at the CA bus. In response to a command execution indication the alternate command data can be decoded according to the second standard to execute an alternate command. In response to decoding a mode exit command received on the CA bus according to the first standard, the memory device can be returned to the default mode. Corresponding methods and systems are also disclosed.

In some embodiments, write or read operations can occur over the CA bus, while read operations and not write operations can occur over the data bus.

BRIEF DESCRIPTION OF THE DRAWINGS

FIG. 5 is a timing diagram showing a memory device entering an alternate management mode according to an embodiment.

FIG. 6A to 6E are diagram showing possible LPDDR4 format commands that can place a memory device into an alternate management mode according to embodiments.

FIG. 7 is a diagram showing possible LPDDR4 commands that can place a memory device into an alternate management mode according to embodiments.

DETAILED DESCRIPTION

Figure 1:
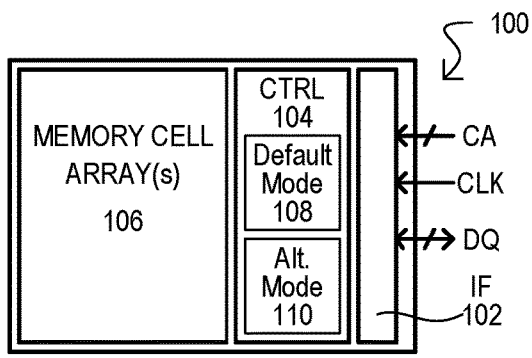
FIG. 1 is a block diagram of a memory device according to an embodiment.

Embodiments can provide for a memory device that have a single interface according to an existing standard that can enable high-speed accesses (e.g., read) to memory storage locations. In response to predetermined inputs over the interface the memory device can be placed into an alternate control mode. In the alternate control mode, additional capabilities (i.e., capabilities not supported by the existing standard) can be mapped to inputs at the interface.

In some embodiments, an existing interface can be compatible with one or more LPDDR standards (e.g., LPDDR2/4), and in the alternate control mode, additional capabilities can be serial interface commands (e.g., SPI) mapped to LPDDR inputs. Such an arrangement can enable a NVM device to provide LPDDR functions and serial port access functions over one interface.

In some embodiments, accesses in the alternate control mode can include write operations that can be performed without the need for write training of a data (DQ) bus, and thus enable the device to meet fast boot time requirements. In some embodiments, write data can be received over a CA bus and not a data bus.

In some embodiments, additional functionalities can be mapped to an existing interface with any suitable memory and/or register operation over a CA bus. In some embodiments, this can include using mode register transactions compatible with an existing standard. An existing standard for an interface (e.g., LPDDR4) can map transactions to a defined register address space. According to embodiments, additional mode registers can be added (i.e., beyond those defined by the standard), and such additional mode registers can be accessed in the additional capabilities.

In some embodiments, an interface can be compatible with a LPDDR4 standard. A host system can use any suitable method for entering the alternate control mode, including but not limited to: read commands to predetermined addresses (which may not be valid location in a memory cell array); a Multi-Purpose Command (MPC); a Mode Register Write (MRW) command, or even a Mode Register Read (MRR) command.

In some embodiments, when a memory device is in an alternate control mode, a mode register space can be repurposed to access additional registers used in embedded operations. Such extended mode registers can implement a command based protocol, like legacy SPI transactions and/or a packet base protocol. In an alternate control mode, standard (legacy) MPC/MRR/MRW operations can be disabled and the MPC/MRR/MRW functionality is used to perform any suitable memory and/or register access. When a memory device exits from the alternate control mode, such standard (legacy) MPC/MRR/MRW operations can be re-enabled.

In the embodiments described, like items are referred to by the same reference character but with the leading digit(s) corresponding to the figure number.

FIG. 1 is a block diagram of a memory device 100 according to an embodiment. A memory device 100 can include an interface 102, control circuits 104, and one or more memory cell arrays 106. An interface 102 can include a unidirectional CA bus, a clock input (CLK) and a bidirectional data bus (DQ). Both CA bus and DQ bus can be multiple bit buses. Memory cell arrays 106 can include memory cells for storing data, including nonvolatile memory cells, volatile memory cells, and combinations thereof.

Control circuits 104 can control operations of memory device 100, including a default mode 108 and an alternate mode 110. A memory device 100 can begin operations in a default mode 108. In a default mode 108, controller circuits can decode command and address data received on CA bus according to a default standard to allow access to memory cell arrays 106. However, certain commands decoded according to the default standard can place the memory device into the alternate mode of operation 110.

In an alternate mode 110, command and address data received at interface 102 can be decoded according to a second standard that differs from the default standard. An alternate mode 110 can result in command data being received and stored in a different manner than in the default mode. Further, command bits values for various memory access functions can be different than in the default mode. In some embodiments, in an alternate mode 110, data (e.g., write data) can be transferred over the CA bus and not the DQ bus. In addition or alternatively, in an alternate mode, command data can be stored differently than in the default mode (e.g., into particular registers or a buffer). While in the alternate mode, control circuits 104 can continue to decode command address data according to the default standard, and in response to receiving certain commands, can return the memory device to the default mode of operation.

It is noted that while in the default mode 108, control circuits 104 can disable decoding according to the second standard.

In some embodiments, a first standard can correspond to a parallel data interface, while a second standard can provide the functionality of another interface or standard. In some embodiments, this can be the functionality of a serial data interface. A first or second standard can identify command values and corresponding data, as well as how such commands are processed. A first or second standard may or may not be a standard promulgated by a standards organization. For example, a first standard can be a DDR standard, such as the LPDDR4 standard.

In this way, by operation of one or more commands, a memory device 100 can switch from a default mode of operation to an alternate mode of operation that can provide a different type of communication channel to the memory device over a same interface.

Figure 2A:
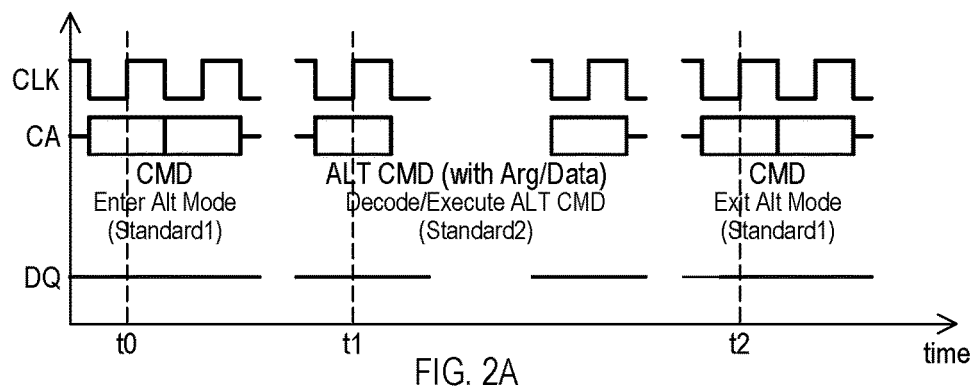
FIGS. 2A and 2B are timing diagram showing memory device operations according to embodiments.
Figure 2B:
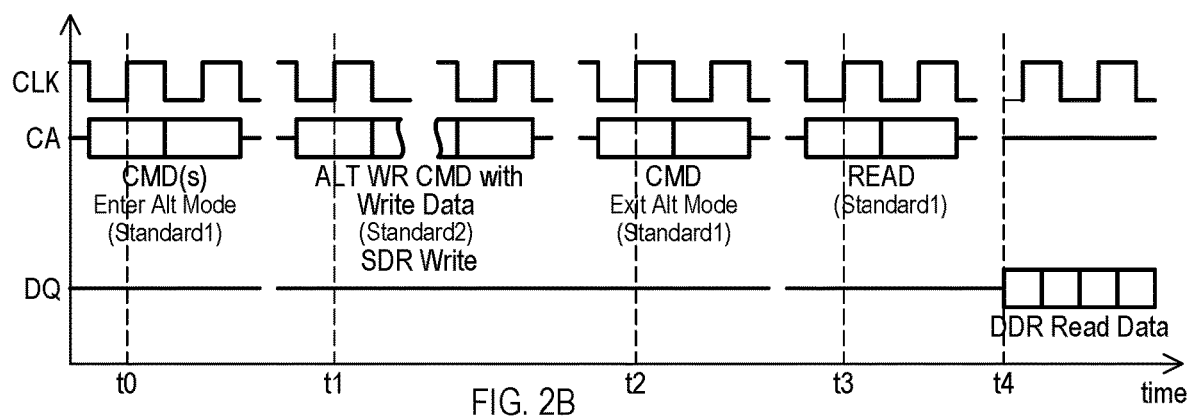

FIGS. 2A and 2B are timing diagrams showing various memory device operations according to embodiments. FIGS. 2A and 2B show waveforms for a timing clock (CLK), a unidirectional CA bus (CA), and a data bus (DQ).

FIG. 2A shows an operation in which an alternate mode can enable command and data values to be received over a CA bus. Referring to FIG. 2A, prior to time t0, it is assumed that the memory device is in a first mode of operation that decodes command address data according to first standard (Standard1).

At time t0, a command can be received on the CA bus. The command can include bit values indicating the type of command, as well as other bits (i.e., arguments, addresses) that specify how the command is executed. Such a command and associated data can be decoded according to the first standard to indicate a switch to an alternate mode. In response, a memory device can enter an alternate mode which enables a different communication channel that can decode received data according to a second standard (Standard2).

At time t1, once the memory device is in the alternate mode, a memory device can receive an alternate command data on the CA bus. It is noted that the alternate command data can include bit values indicating an alternate command, as well as associated data. For example, if an alternate command is a write operation (e.g., to an array or register), write data can be included. It is noted that in the embodiment shown, such data is not provided on the DQ bus. An alternate command can be decoded according to the second standard to determine the type of memory device operation to be performed. In the embodiment shown, an alternate command and any associated data can be received at a single data rate (e.g., parallel data bit sets received once per CLK cycle on the CA bus). In some embodiments, a DQ bus can be a unidirectional bus that provides output data from a memory device, but that does receive input data for the memory device.

At time t2, another command can be received over the CA bus. Such a command can be decoded according to the first standard to indicate an exit from the alternate mode. In response, a memory device can return to the first mode of operation. This can disable the alternate communication path provided in the alternate mode. That is, values received will no longer be processed according to the second standard.

In this way, a memory device can be placed into an alternate mode in which command (with arguments and/or data) can be received over a CA bus and decoded according to an alternate standard.

FIG. 2B shows operations in which data writes can include receiving write data over the CA bus in an alternate mode, and providing read data over the DQ bus in the first mode. FIG. 2B can generally follow the operation described in FIG. 2A, but can differ as follows:

At time t1, once the memory device is in the alternate mode, a memory device can receive an alternate command on the CA bus, which is decoded according to the alternate protocol into a write command with a corresponding write address and write data. Such an alternate write command and write data can be received at a single data rate (SDR). The write command can result in write data being written into the memory device.

At time t2, the memory device exits the alternate mode.

At time t3, once the memory device has returned to the first mode, a memory device can receive a command on the CA bus, which is decoded according to the first standard as a read command with a corresponding read address.

At time t4, in response to the read command, read data can be output on the DQ bus. In the embodiment shown, such read data can be output at a double data rate (DDR).

In this way, a memory device can be switched from a first mode to an alternate mode in which write operations (e.g., write commands and write data) can occur over a CA bus at a single data rate with respect to a timing clock. In the first mode, read operations can occur with a read command received at the CA bus, and read data being output on a DQ bus at a double data rate with respect to the timing clock.

Figure 3A:
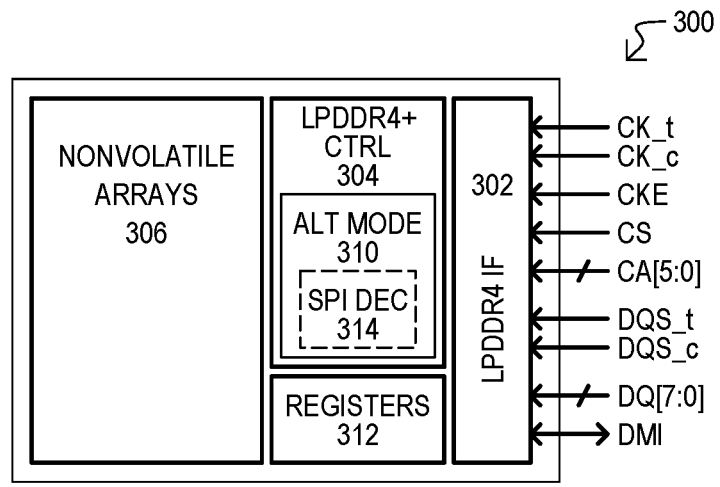
FIG. 3A is a block diagram of a memory device according to another embodiment.

FIG. 3A is a block diagram of a memory device 300 according to another embodiment. A memory device 300 can be a nonvolatile memory device 300 having a LPDDR4 interface (IF) 302, controller circuits 304, nonvolatile memory cell arrays 306 and registers 312. LPDDR4 IF 302 can have inputs/outputs (IOs) compatible with a JEDEC standard JESD209-4D. Such IOs can include, but are not limited to: complementary clock inputs (CK_t, CK_c), a clock enable input (CKE), a chip select input (CS), a CA bus (CA[5:0]), complementary data strobes (DQS_t, DQS_c), a data bus DQ, and a data mask/inversion IO (DMI).

Control circuits 304 can process transactions over LPDDR4 IF 302 according to a LPDDR4 standard. However, in addition, control circuits 304 can also include an alternate mode 310 in which data values received over LPDDR4 IF 302 can be decoded according to a second standard 314, which can provide the functionality of a SPI standard in some embodiments. That is, bit values of received data can be decoded as commands of a different standard (i.e., not as LPDDR4 commands). Control circuits 304 can be placed into an alternate mode with any suitable method, including but not limited to particular LPDDR4 type commands, as described herein and equivalents.

Registers 312 can include mode registers and the like, as well as additional registers used to receive data in an alternate mode of operation. In some embodiments, registers 312 can include mode registers compatible with an LPDDR4 standard.

Nonvolatile arrays 306 can include one or more memory cell arrays that can store data in the absence of power. Write operations can include programming memory cells. Nonvolatile memory cells can include any suitable technology, including charge storage (e.g., EPROM, EEPROM, including Flash EEPROMs), ferroelectric, magneto-resistive, phase-change, and those that rely on oxidation-reduction by application of electric fields. Memory cell arrays can have any suitable organization, including NOR-type and NAND type.

In this way, a nonvolatile memory device can include an LPDDR4 compatible interface that can execute LPDDR4 commands as well as alternate commands when an alternate mode is enabled. In some embodiments, such alternate commands can provide the functionality of another standard (e.g., SPI).

Figure 3B:
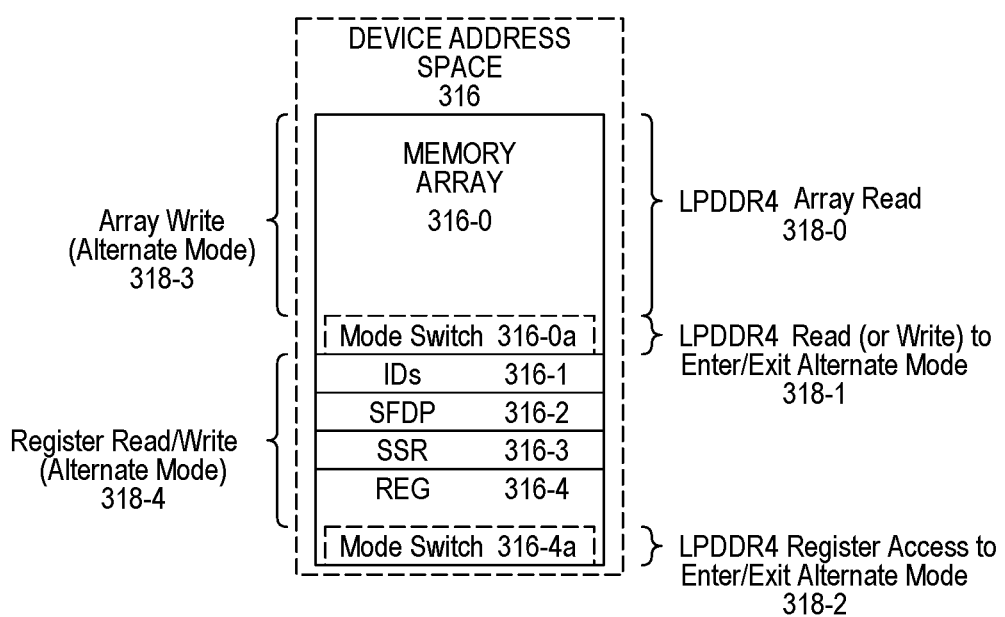
FIG. 3B is a diagram showing a memory device address space according to an embodiment.

FIG. 3B is a diagram showing a device address space 316 for an embodiment like that of FIG. 3A. A device address space 316 can include memory array regions 316-0 accessible by array read and write operations, identification registers 316-1, Serial Flash Discoverable Parameter (SFDP) registers 316-2, Secure Silicon Registers (SSR) 316-3, and mode registers 316-4.

According to embodiments, memory accesses and/or register accesses can place a memory device into an alternate mode. Memory accesses and/or register accesses can also exit the memory device from the alternate mode. In the embodiment shown, LPDDR4 read commands (318-0) addressed to memory array address space 316-0 can read stored data. In addition, LPPDR4 array read and/or write commands (318-1) to a mode switch address space 316-0a, can result in the memory device entering/exiting an alternate mode. Similarly, LPPDR4 register read and/or write commands (318-2), can result in the memory device entering/exiting the alternate mode.

Referring still to FIG. 3B when a device is in an alternate mode, array locations can be written with alternate write (e.g., program) commands 318-3 received over the LPPDR4 interface. Such alternate write commands can provide the same functionality as a SPI write command. In the alternate mode, registers (316-1, 316-2, 316-3 and 316-4) can be accessed with alternate register read/write commands 318-4 embedded in commands received over the LPDDR4 interface. It is noted that in some embodiments, a register space accessed by alternate register read/writes can be larger than that accessed by LPDDR4 register read/writes.

In this way, portions of a memory device address space can be dedicated to commands compatible with a first standard that enable a memory device to enter and exit an alternate mode of operation. In the alternate mode of operation, memory device operations can be controlled with commands that provide a same functionality as a second standard.

In this way, the functionality of second standard (e.g., SPI) can be mapped to the interface of a first standard (e.g., LPDDR4) using the existing first standard infrastructure.

Figure 4:
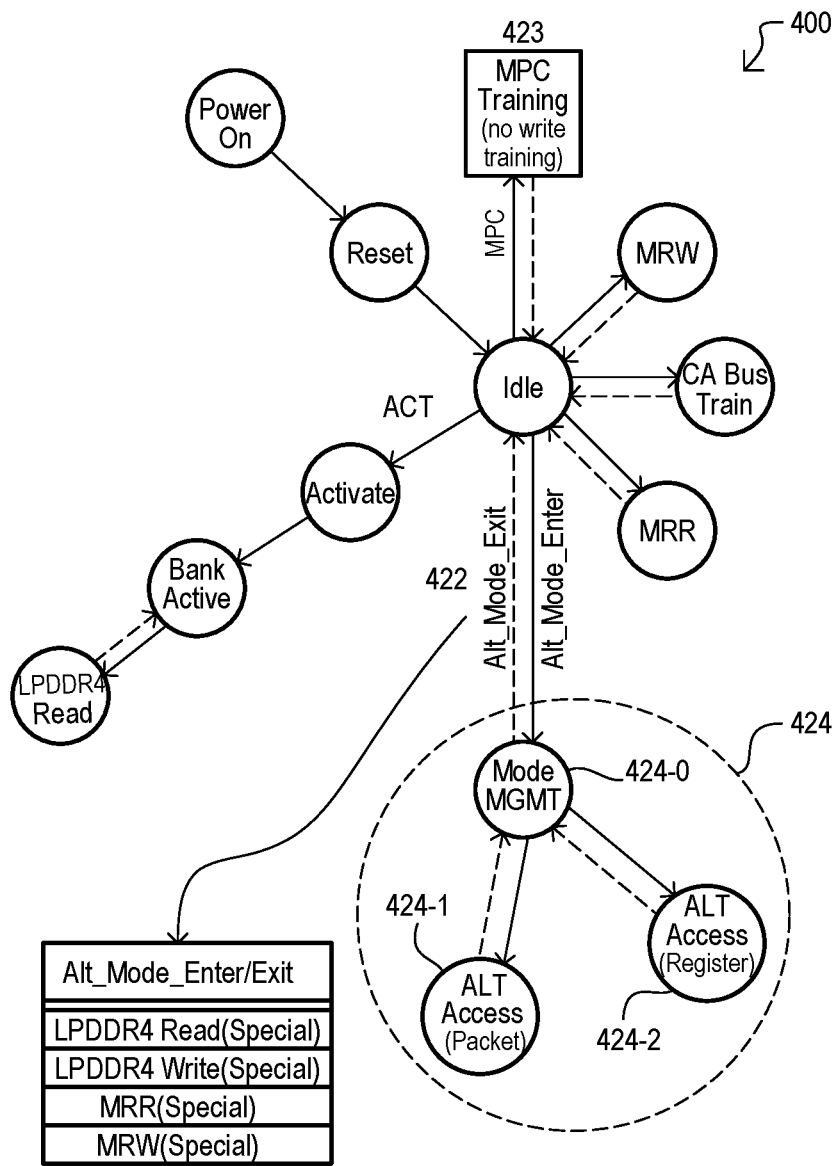
FIG. 4 is a state diagram of memory device operations according to embodiments.

FIG. 4 is a state diagram 400 of memory device operations according to an embodiment. Memory device operations can include conventional actions compatible with a first standard (e.g., LPDDR4), including powering on (Power On) or reset (Reset) to enter an idle state (Idle). From the idle state a memory device can enter a training state (MPC Training 423) via multipurpose commands, mode register write (MRW) and read (MRR) states, a CA bus training state (CA Bus Train). With activate commands (ACT), a memory device can activate a bank (Bank Active) to execute read (LPDDR4 Read) commands. In some embodiments, MPC training may not include write training, enabling a memory device to have a relatively fast initial power-on/reset time.

Referring still to FIG. 4, in response to one or more specialized commands 422, a memory device can enter into (Alt_Mode_Enter) or exit from (Alt_Mode_Exit) an alternate management mode 424. Specialized commands 422 can take any suitable form, and in the embodiment shown can include one or more commands compatible with the first standard, including but not limited to: a special array read command (LPDDR4 Read), special MRR command, or special MRW command. Such commands can be "special" in that they can include accompanying addresses and/or arguments that would otherwise not be assigned or not valid according to the first standard.

In the alternate mode 424, a memory device can enter a mode management state 424-0 which can enable a memory device to be controlled with alternate accesses. In the embodiment shown, alternate accesses can include alternate accesses via register access operations 424-2 and/or alternate accesses via packet access operations 424-1. In some embodiments, register access operations 424-2 can include register operations according the first standard (e.g., MRW, MRR) to transfer data into and/or out of the memory device, including command data with addresses and/or arguments according to another standard (e.g., SPI). In some embodiments, packet access operations 424-1 can include receiving a packet, and parsing the packet to determine operations to be performed. Such packet processing can determine command data with addresses and/or arguments according to another standard (e.g., SPI).

In this way, a memory device can include logic to enable the transition into alternate management state upon receipt of specialized commands over an interface. In the alternate management state, memory device operations can be controlled with an alternate set of commands received over the same interface.

FIG. 5 is a timing diagram showing how a LPDDR4 compatible memory device can be placed into an alternate management mode. FIG. 5 includes waveforms for a timing clock (CK_t), a chip select signal (CS), a CA bus (CA), descriptions of the commands or operations performed (Command/Operations), and data bus DQ.

At time t1, a memory device can receive a "mode enter" command pair (Cmd-1/Cmd-2) which can place the device into an alternate mode, as described herein or equivalents. In some embodiments, a command pair (Cmd-1/Cmd-2) can have an LPDDR4 format, with each command being received over two clock cycles.

At time t3, after receiving the mode enter commands (Cmd-1/Cmd-2), a memory device can switch to the alternate mode, enabling accesses (ACCESS NOVO, i.e., access nonvolatile) using an alternate communication methods/paths. Such alternate communications can occur over a CA bus. In some embodiments, there can be some delay (tsw-alt) between receipt of mode switch commands (Cmd-1/Cmd-2) and the ability to execute operations in the alternate mode. However, in other embodiments, alternate communications can include a continuous sequence of values over the CA bus.

Optionally, a mode enter command pair can be preceded by activate commands (Activate1/Activate2). Such an optional arrangement is shown in FIG. 5 by activate commands (Activate1/Activate2) occurring at time t0. In some embodiments, mode enter commands (Cmd-1/Cmd-2) can be issued after a minimum delay (e.g., tRCD) following ACT1/ACT2. However, it is understood embodiments anticipate the capability of entering an alternate mode without preceding activation commands.

It is also understood that the timing presented in FIG. 5 can be used for mode exit commands as well (i.e., a command pair that exits the memory device from the alternate mode). Further, while FIG. 5 shows an alternate mode being entered or exited with command pairs, other embodiments can enter and/or exit an alternate mode in response to the receipt of one command (i.e., Cmd-1 only, or Cmd-2 only).

In this way, LPDDR4 commands can be used to enter and exit an alternate mode in which a memory device can be controlled with one or more other sets of commands received via the same LPDDR4 interface.

FIGS. 6A to 6E are diagrams showing command pairs that can be used to enter an alternate mode and/or exit an alternate mode. Command pairs can be compatible with an LPPDR4 format, but can include arguments that are not defined by the standard in a current form.

FIG. 6A shows an array read command pair for entering or exiting an alternate mode. Various bit values "H", "L", "BL", "AP" can define the commands as read commands. Argument bit values shown as "V" can indicate the commands are mode enter or mode exit commands. In some embodiments, bit values "V" can present undefined values according to an LPDDR4 standard, or can be defined values (i.e., replacing an existing command).

FIG. 6B shows an array write command pair for entering or exiting an alternate mode. The format of FIG. 6B is understood from the description of FIG. 6A.

FIG. 6C shows a mode register read command pair for entering or exiting an alternate mode. Various bit values "H", "L", "BL", "AP" can define the commands as mode register write commands. Argument bit values "Op0:Op7" can indicate the commands are mode enter or mode exit commands. In some embodiments, bit values "Op0:Op7" can present undefined values according to an LPDDR4 standard, or can be defined values (i.e., replacing an existing command).

FIG. 6D shows a mode register write command pair for entering or exiting an alternate mode. The format of FIG. 6D is understood from the description of FIG. 6A.

FIG. 6E shows a multipurpose command pair for entering or exiting an alternate mode. The format of FIG. 6E is understood from the description of FIG. 6A.

In this way, commands compatible with existing standard (e.g., LPDDR4) can be used to place a memory device into an alternate mode of operation. As noted above, in some embodiments single command (as opposed to command pairs) can result in a memory device entering/exiting an alternate mode.

FIG. 7 is a diagram showing other possible commands that can be used to enter or exit an alternate mode. The commands shown can be compatible with an LPPDR4 format, but can occupy a command space (bit combinations) that are not currently defined by a standard. The format of the commands shown in FIG. 7 is understood from the description of FIG. 6A.

In this way, commands bit combinations of an unused command space can be used to enter or exit an alternate mode.

Figure 8:
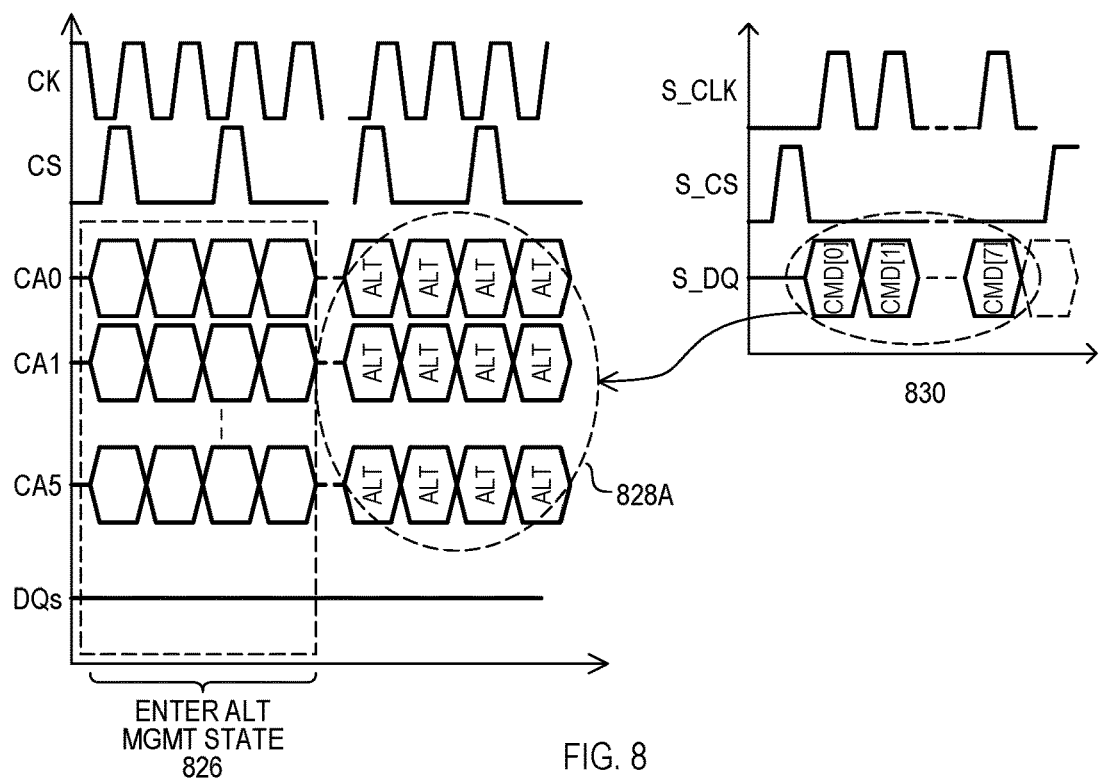
FIG. 8 is a timing diagram showing alternate command data received via a command-address (CA) bus according to an embodiment.
Figure 9:
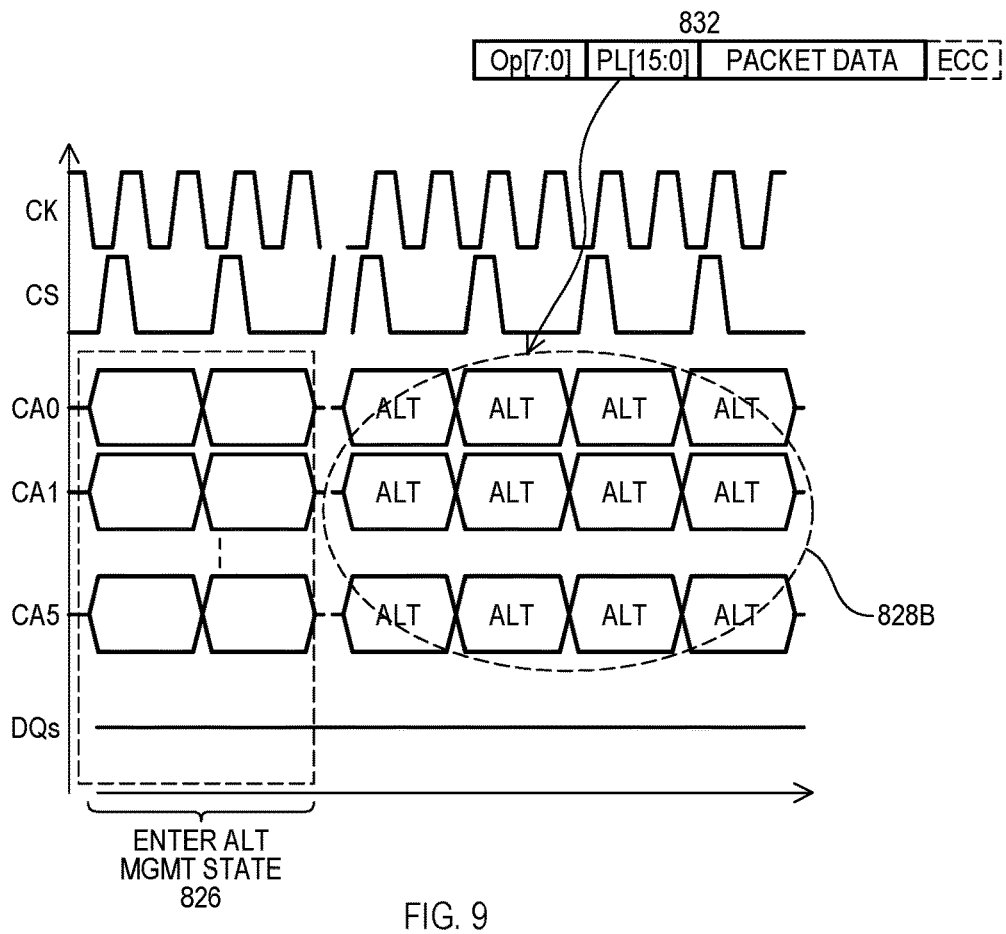
FIG. 9 is a timing diagram showing alternate command data received as a data packet via a CA bus according to an embodiment.

FIGS. 8 and 9 are timing diagrams showing alternate path communications over a CA bus according to embodiments. FIGS. 8 and 9 include waveforms for a clock signal (CK); chip select signal (CS), CA bus inputs (CA0 to CA5), and data IOs (DQs). In some embodiments, the operations of FIGS. 8A and 8B are compatible with a LPDDR4 interface.

FIG. 8 shows an operation in which a memory device can receive alternate command (and associated data) over a CA bus. A memory device can first be placed into an alternate mode 826. Such an action can include any suitable command input as described herein or an equivalent.

Following entry into the alternate mode 826, alternate mode data 828A can be received over the CA bus (CA0 to CA5). Alternate mode data 828A can include command data, and optionally, additional data, such as argument data and/or address data. In some embodiments, alternate mode data 828A can be compatible with another standard 830, reformatted for a CA bus. In the embodiment shown, another standard can be an SPI standard, and alternate data 828A can include SPI command bits (CMD[0] to CMD[7]) and, according to command type, corresponding arguments or address data.

FIG. 9 shows an operation in which a memory device can receive a data packet over a CA bus. A data packet can take any suitable form, and can include command and associated data. FIG. 9 shows reception of packet data 832 over CA bus. A packet data 832 can include command values (OP [7:0]), packet length values (PL[15:0]), packet data (PACKET DATA) and optionally, error detection and/or correction data (ECC). Such packet values can be received as alternate data 828B over a CA bus in an alternate mode of operation.

It is understood that alternate command data shown in FIGS. 8 and 9 is decoded differently and/or processed differently than in a default mode of operation.

In this way, when switched to an alternate mode of operation, a memory device can receive alternate command data on a CA bus.

Figure 10:
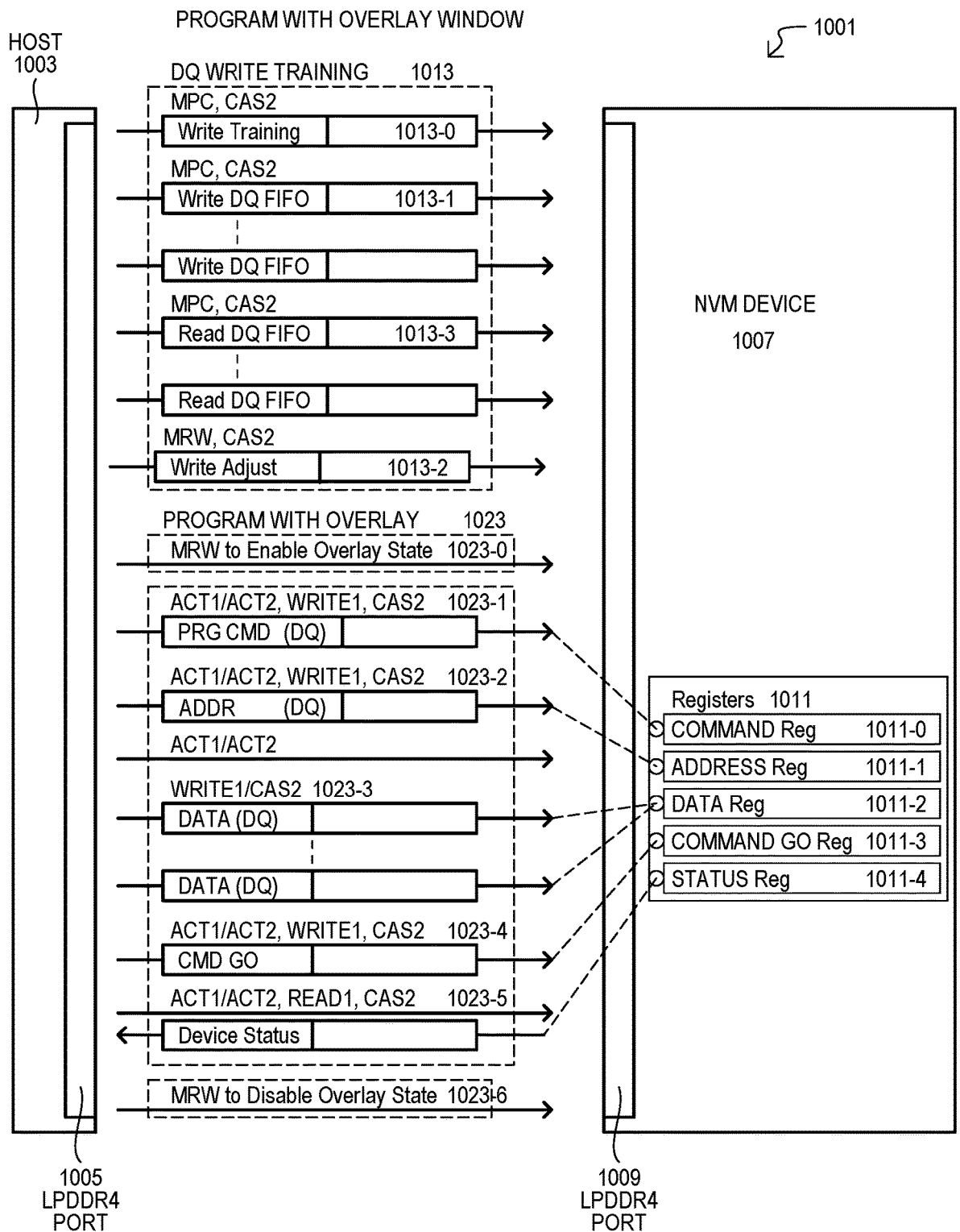
FIG. 10 is a diagram of a conventional system that utilizes an overlay state to write command data to registers of a memory device.

To better understand the various features of the embodiments, conventional overlay window operations will be described. FIG. 10 shows a conventional LPDDR4 system 1001 that can place an NVM device into an overlay mode in which data values, such as commands, can be written into NVM device registers with data write operations over DQs.

A system 1001 can include a host device 1003 and nonvolatile memory (NVM) device 1007 in communication over an LPDDR4 bus. Host device 1003 can include an LPDDR4 port 1005, and can issue LPDDR4 compatible commands to NVM device 1007. NVM device 1007 can include LPDDR4 port 1009 and registers 1011.

FIG. 10 shows using an overlay mode to execute a NVM device 1007 program operation. Because data will be transferred over DQs, a NVM device 1007 must first undergo training 1013, which can include read and write training. Write training can include receiving a sequence of commands to enter a write training mode 1013-0. Once in the write training mode, write and read operations over a DQ bus can occur 1031-1 and 1031-2. In response to such operations, timing adjustments can be made 1013-2. It is understood that write training can include multiple iterations of the write/read and adjust operations 1013-0/1/2. As noted above, this and other write training operations can require considerable amounts of time (e.g., >200 ms).

After write training has occurred, NVM device 1007 can be programmed using a write overlay state 1023. A sequence of commands can enable an overlay state 1023-0. In the overlay state, NVM device 1007 can receive commands from host device 1003 that perform the following: write a program command 1023-1 to a register 1011-0 via a DQ bus; write address data 1023-2 to a register 1011-1 via the DQ bus; and write program data 1023-3 to one or more registers 1011-2 via the DQ bus. A program operation can then be initiated 1023-4 by writing to a command go register 1011-3 via DQs. Following the execution of the program operation, a device status register 1011-4 can be read 1023-5 to determine the status of the program operation. Such status data can be read over DQs. A sequence of commands can then disable the overlay state 1023-0.

Thus, overlay window operations require write training, and provide data values with array write and read commands to predetermined addresses that can overlap existing array addresses.

Figure 11:
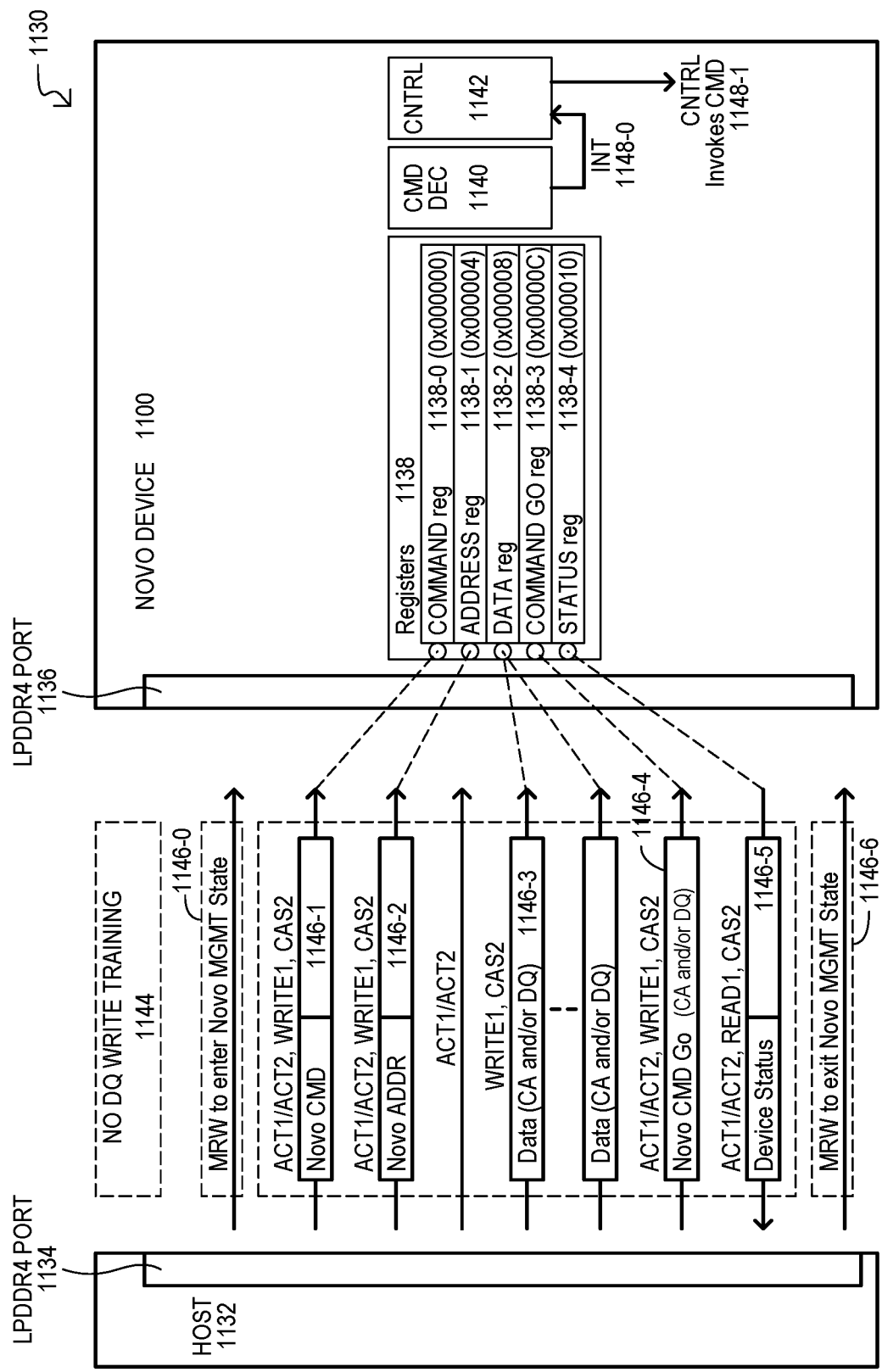
FIG. 11 is a diagram of a system and operations according to an embodiment.

FIG. 11 is a block diagram of a system 1130 and operation according to an embodiment. A system 1130 can include a NVM device 1100 and a host device 1132 connected to one another by an LPDDR4 compatible bus. A host device 1132 can include a host LPDDR4 port 1134 by which a host can transmit data over a LPDDR4 bus to an LPDDR port 1136 of a NVM device 1000. NVM device 1000 can include registers 1138, a command decoder 1140 and control circuits 1142. NVM device 1000 can also include NV storage locations (not shown) which can be accessed in an alternate a management mode. Registers 1138 can include registers accessible according to an existing LPDDR4 standard (i.e., mode registers), but can also include additional register to provide a larger register space than that indicated by the LPDDR4 standard.

FIG. 11 shows a NVM device 1100 that can be placed into an alternate management mode which can execute alternate commands (i.e., non-LPDDR4 commands) for managing a NVM device with write operations to register locations on the NVM device.

Unlike conventional approaches like that of FIG. 10, operations in an alternate mode can occur without write training 1144. This can enable NVM device management operations (e.g., program) in applications requiring rapid data input quickly after a device has been powered up (e.g., boot operations), which may not be possible when write training is required.

In the embodiment shown, a host device 1132 can issue a MRW command 1146-0 according to the LPDDR4 standard to place NVM device 1100 into an alternate (management) state. The alternate state can establish an alternate communication channel over the LPDDR4 bus. The alternate communications channel can enable operations of the NVM device 1100 to be controlled with command data not included in the LPDDR4 standard.

An alternate NVM control command can be issued with a command sequence which can include LPDDR4 commands ACT1/ACT2/WRITE1/CAS2, which can have specialized argument bits to indicate an alternate command 1146-1. In contrast to conventional overlay window approaches, such a command sequence may not be accompanied by data on a DQ bus. An alternate command 1146-1 can include any suitable NVM device management command, including array program, array erase, and register accesses, as but a few of many possible examples. In response to alternate command sequence 1146-1 a command value can be stored in a register 1138-0 of NVM device 1100.

In the embodiment shown, following command data, corresponding address values can be provided with a command sequence that can include LPDDR4 commands ACT1/ACT2/WRITE1/CAS2 1146-2. In response, an address value can be stored in register 1138-1 of NVM device 1100.

In the embodiment shown, following address values, corresponding data can be provided with an initial command sequence that can include LPDDR4 commands ACT1/ACT2/WRITE1/CAS2 1146-3. Additional data can be provided with following on WRITE1/CAS2 commands. Such data can be provided over a CA bus, a DQ bus, or a combination thereof. In response, data values can be stored in one or more registers 1138-2 of NVM device 1100. While data may accompany some alternate commands (e.g., array program, register write), other alternate commands may include accompanying data (e.g., array read, register read).

In the embodiment shown, the execution of alternate commands can be initiated by a command execution indication. A command execution indication can take any suitable form, and in FIG. 11 includes a command sequence that can include LPDDR4 commands ACT1/ACT2/WRITE1/CAS2 1146-4. Such a sequence can result in a "command go" value can be stored in a register 1138-3 of NVM device 1100.

In response to a command go value being written into register 1138-3, command decoder 1140 can generate an interrupt 1148-0. In response to the interrupt 1148-0, control circuits 1142 can access registers 1138-0 to -2, to invoke the indicated alternate command 1148-1 to execute the alternate command.

Following execution of the alternate command, controller circuits 1142 can generate a status value in register 1138-4 that can indicate the results of executing the alternate command. Such status data can be subsequently retrieved from NVM device 1100 with a command sequence that can include LPDDR4 commands ACT1/ACT2/READ1/CAS2 1146-5. In some embodiments, such status data can be transferred over a DQ bus.

When all desired alternate command operations have been performed, an alternate state can be exited with a MRW command 1146-6. NVM device 1100 can then interpret commands received from a host according to the LPDDR4 standard.

In this way, a system having a host in communication with a NVM device over a standardized interface can enable an alternate communications path for executing NVM device management functions not covered by the standard. Such operations can be performed without write training of a data bus.

Figure 12:
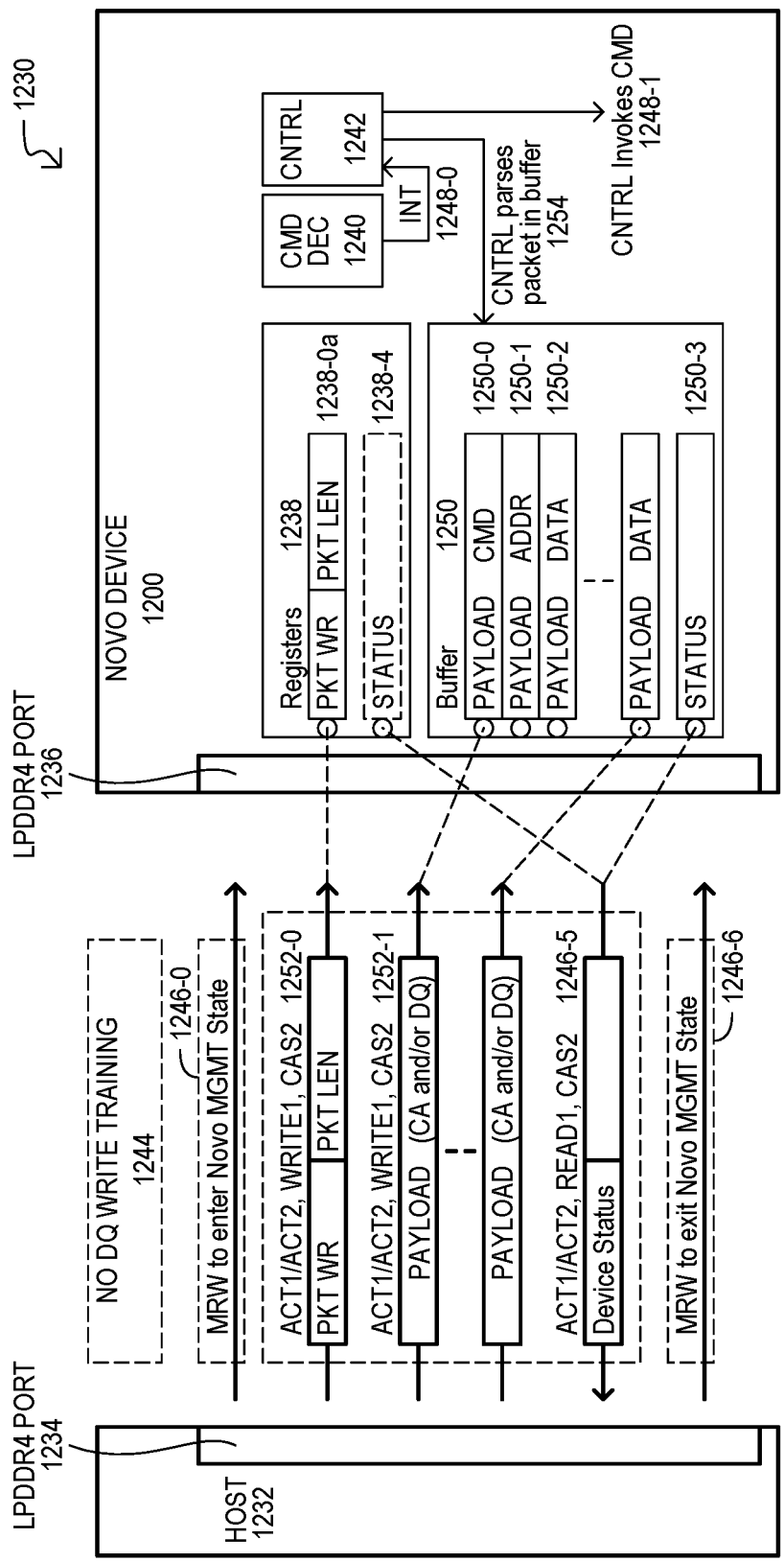
FIG. 12 is a diagram of a system and operations according to another embodiment.

FIG. 12 is a block diagram of a system 1230 and operation according to another embodiment. A system 1230 can include items like those of FIG. 11. FIG. 12 can differ from FIG. 11 in that an NVM device can include a buffer 1250 that can store received data values at addressable locations 1250-0 to 1250-3. Such locations are different from NVM storage locations of NVM device 1200. Buffer 1250 can be formed with memory circuits that provide more rapid read and write speeds than the main memory of the NVM device 1200, such as SRAM as but one example.

FIG. 12 shows a NVM device 1200 that can be placed into an alternate management mode to receive packet data, which can include alternate commands for managing the NVM device.

As in the case of FIG. 11, operations in an alternate mode can occur without write training 1244, and a host device 1232 can issue a MRW command 1246-0 to place NVM device 1200 into an alternate state.

Once in the alternate state, a host device 1232 can indicate a data packet transmission with a command sequence which can include LPDDR4 commands ACT1/ACT2/WRITE1/CAS21252-0. Such a command sequence can include argument values that can indicate a packet transmission, including a size of the packet (PKT LEN). In response, a packet features can be stored in a register 1238-0a of NVM device 1200.

Following the packet data write indication, packet data can be provided by host device 1232 with a sequence of commands which can be LPDDR4 compatible commands ACT1/ACT2/WRITE1/CAS2 1252-1. In response, the packet data can be stored in buffer 1250 of NVM device 1100. Packet data can include data for executing an alternate command for NVM device, and in the embodiment shown, can include a command, address, and data.

In response to a packet indication in register 1238-0a and/or reception of packet data in buffer 1250, a command decoder 1240 can generate an interrupt 1248-0. In response to the interrupt 1248-0, control circuits 1242 can parse the packet data stored in buffer 1250 to determine the alternate command and corresponding values (e.g., address and data). Such parsing can include accessing certain addresses in buffer 1250. Such addresses can be predetermined, or indicated by packet data in register 1238-0a. From the parsing of packet data, control circuits 1242 can invoke the indicated command 1248-1 to execute the alternate command.

Following execution of the alternate command, control circuits 1242 can generate a status value in a register 1238-4 or at predetermined address 1250-3 of buffer 1250. Such status data can be subsequently retrieved from NVM device 1200 with a command sequence that can include LPDDR4 commands ACT1/ACT2/READ1/CAS2 1246-5 addressed to the appropriate register or buffer address. In some embodiments, such status data can be transferred over a DQ bus.

When all desired alternate command operations have been performed, an alternate state can be exited with a MRW command 1246-6.

In this way, a system having a host in communication with a NVM device over a standardized interface can enable an alternate communications path for receiving packet data, which can include NVM device management functions not covered by the standard. Such operations can be performed without write training of a data bus.

Figure 13:
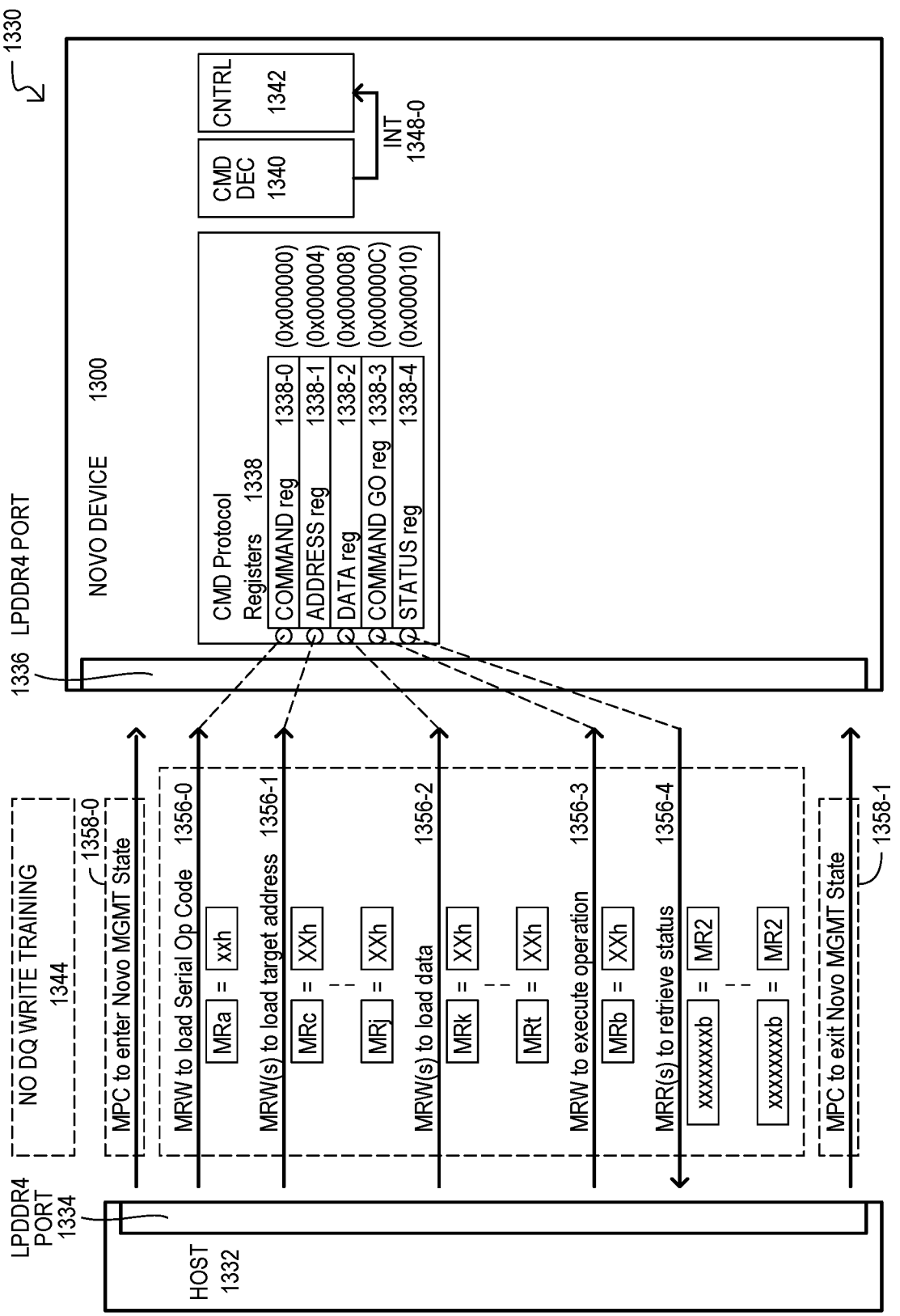
FIG. 13 is a diagram of a system and operations according to a further embodiment.

FIG. 13 is a block diagram of a system 1330 and operation according to a further embodiment. A system 1330 can include items like those of FIG. 11.

FIG. 13 shows a NVM device 1300 that can be placed into an alternate mode to receive command data through a sequence of register write operations.

As in the case of FIG. 11, operations in an alternate mode can occur without write training 1344. A host device 1332 can issue MPC 1358-0 to place NVM device 1300 into an alternate state. Such a MPC can have arguments not defined by a current LPDDR4 standard, and thus can be considered a specialized MPC.

Once in the alternate state, a host device 1332 can execute MRW operations according to the LPDDR4 standard to load NVM device registers 1338 with alternate command data. In the embodiment shown, such actions can include: a MRW 1356-0 which can load register 1338-0 with alternate command data (e.g., an op code); one or more MRWs 1356-1 which can load register(s) 1338-1 with address data (if suitable for the command, such as an array address); and one or more MRWs 1356-2 which can load register(s) 1338-2 with data (if suitable for the command, such as program data).

In the embodiment shown, the execution of alternate commands can be initiated by MRW to a "command go" type register 1338-3 of NVM device 1300. In response, command decoder 1340 can generate an interrupt 1348-0, and the alternate command stored in registers 1338-0 to -4 can be executed.

Following execution of the alternate command, controller circuits 1342 can generate a status value in register 1338-4 which can be subsequently retrieved from NVM device 1300 with a mode register read (MRR) command 1356-4. In some embodiments, such status data can be transferred over a DQ bus.

When all desired alternate command operations have been performed, an alternate state can be exited with another specialized MPC 1358-1.

In this way, a system having a host in communication with a NVM device over a standardized interface can use register write and read operations as an alternate communication channel for executing NVM device management functions not covered by the standard. Such operations can be performed without write training of a data bus.

Figure 14:
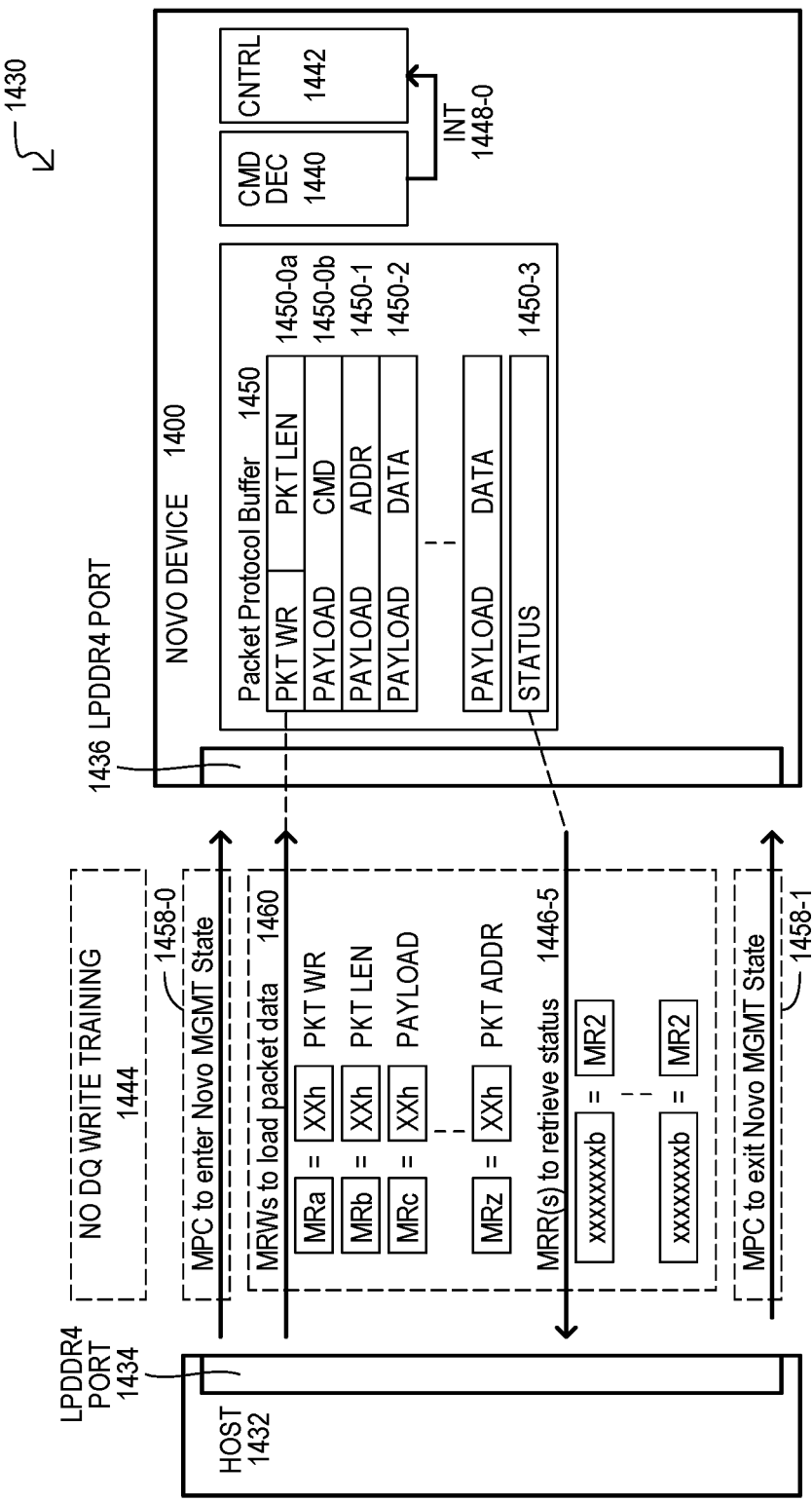
FIG. 14 is a diagram of a system and operations according to a further embodiment.

FIG. 14 is a block diagram of a system 1430 and operation according to a further embodiment. A system 1430 can include items like those of FIG. 11.

FIG. 14 shows a NVM device 1400 that can be placed into in an alternate mode to receive data packets via an alternate communication channel through a sequence of register write operations. Such data packets can include alternate command data for executing NVM operations.

As in the case of FIG. 11, operations in an alternate mode can occur without write training 1444. As in the case of FIG. 13, A host device 1432 can issue a special MPC 1458-0 to place NVM device 1400 into an alternate state.

Once in the alternate state, a host device 1432 can execute a sequence of MRW operations according to the LPDDR4 standard to transfer a data packet to a buffer 1450 within NVM device 1400. A data packet within buffer 1450 can have various values accessible at buffer addresses. In the embodiment shown, such data can include; a packet write indication and packet length at address 1450-0a; alternate command at address 1450-0b; address data (if suitable for the command) at address 1450-1; and corresponding data at addresses 1450-2 (if suitable for the command).

In response to reception of the data packet, command decoder 1440 can generate an interrupt 1448-0, the packet data can be parsed, and the alternate command stored in buffer 1450 can be executed.

Following execution of the alternate command, controller circuits 1442 can write a status value to buffer 1450 at address 1450-3 which can be subsequently retrieved from NVM device 1400 with one or more MRR commands 1446-5. In some embodiments, such status data can be transferred over a DQ bus.

When all desired alternate command operations have been performed, an alternate state can be exited with another specialized MPC 1458-1.

In this way, a system having a host in communication with a NVM device over a standardized interface can use register write and read operations as an alternate communication channel for transferring data packets with alternate device management commands. Such operations can be performed without write training of a data bus.

While embodiments herein disclose a buffer for storing packets that includes randomly addressable locations, alternate embodiments can include buffers where storage order (e.g., FIFO, LIFO) can be used to determine the type of data (e.g., command, address, data).

Figure 15:
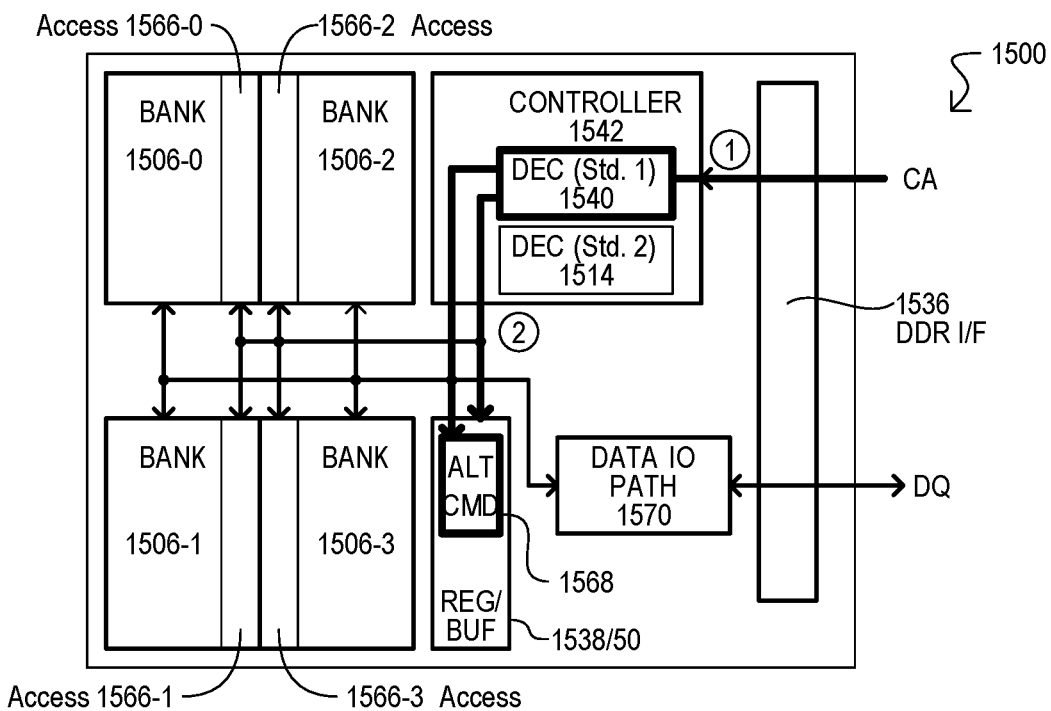
FIGS. 15, 16 and 17 are diagrams showing the processing of alternate command data in a memory device according to embodiments.
Figure 16:
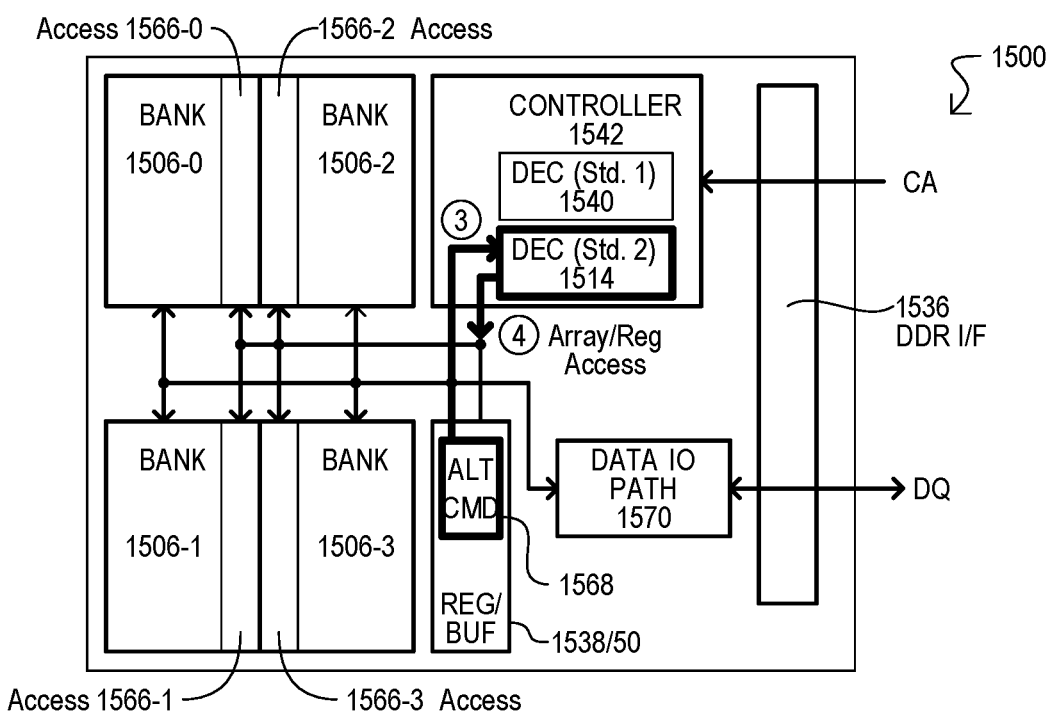
Figure 17:
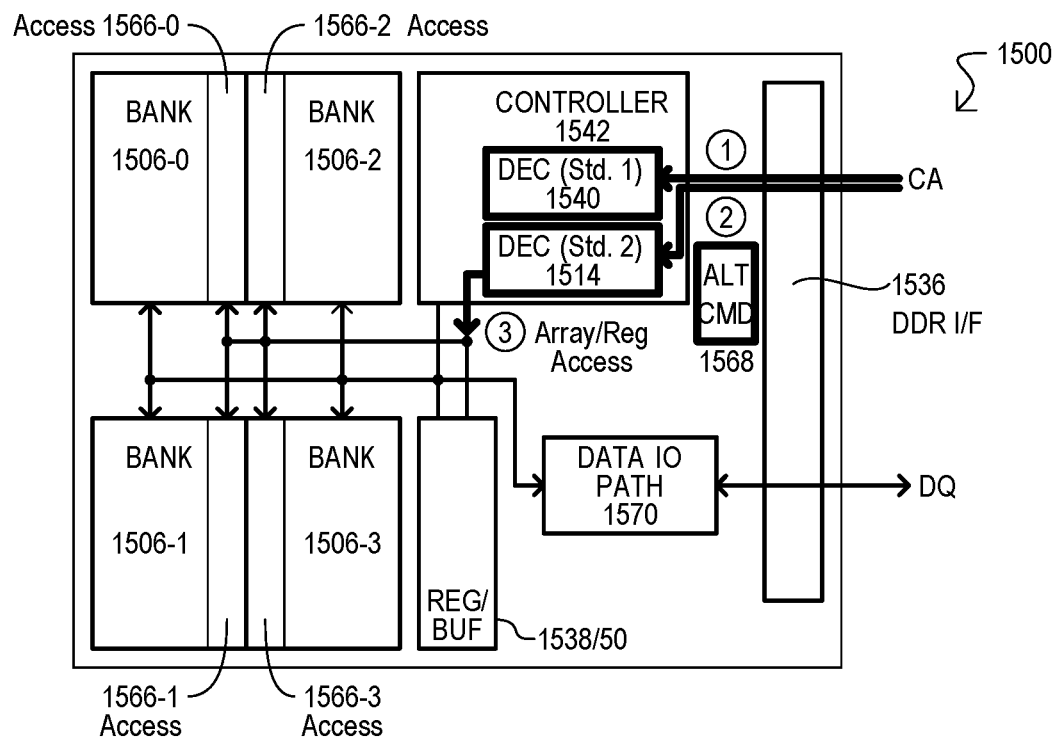

FIGS. 15 to 17 shows the processing of alternate command data in a memory device according to various embodiments. FIGS. 15 to 17 show a memory device 1500 that can include banks 1506-0 to 1506-3 with corresponding access circuits 1566-0 to 1566-3, alternate command storage circuits 1538/50, controller circuits 1542, data 10 path 1570, and a DDR interface 1536. Each bank (1506-0 to -3) can include one or more memory cell arrays that include non-volatile and/or volatile memory cells. Access circuits (1566-0 to -3) can enable access to banks (1506-0 to -3) and can include row/column decoders and various other circuits (e.g., sense/write amplifiers, program/erase circuits).

Controller circuits 1542 can include a first decoding function 1540 and second decoding function 1514. A first decoding function 1540 can decode command data according to one standard (e.g., LPDDR4) while a second decoding function 1514 can decode command data according to a second standard (e.g., SPI), which can be considered "embedded operations". Storage circuits 1538/50 can receive and store alternate command data. Alternate command data can be for the embedded operations. Storage circuits 1538/50 can take any suitable form, including registers and/or a buffer. A data 10 path 1570 can provide a data path between a DQ bus and banks (1506-0 to -3) and storage circuits 1538/50.

FIGS. 15 and 16 show an alternate command processing operations according to an embodiment.

FIG. 15 shows at ① receipt of command-address data on CA bus (CA). At ②, the received command-address data can be decoded by first decoding function 1540 to store alternate command data 1568 in storage circuits 1538/50. Such an operation can take any suitable form, including but not limited to: register write operations or specialized array write operations. Alternate command data 1568 can include a command and associated values (e.g., address, data). Alternate command data 1568 can have any suitable format, including separated values (command, address, data) or a continuous value that must be parsed (packet).

FIG. 16 shows at ③, second decoding function 1514 accessing storage circuit 1538/50 to decode alternate command data 1568. Such alternate decoding can include accessing registers to derive values and/or parsing data stored in a buffer to derive values. At ④, in response to such decoding, a controller 1524 can generate array/register access control signals which can execute the alternate command (e.g., array program, register write, array read, register read).

In this way, a memory device can receive commands according to one standard that result in the storing of alternate command data. Subsequently, such alternate command data can be decoded according to a second standard to execute operations in the memory device.

FIG. 17 shows the processing of alternate command data in a memory device according to a further embodiment. FIG. 17 shows a memory device 1500 like that of FIG. 15. FIG. 17 can differ from that of FIG. 15 in that alternate command data is not stored in storage circuits, but rather decoded "on-the-fly" from CA bus.

FIG. 17 shows at ①the receipt of command-address data on CA bus. However, such command-address data does not include alternate command data. Rather, such command-address data can configure controller circuits 1542 to start decoding received data according to a second standard. At ②alternate command data 1568 can be received on CA bus. Such alternate command data 1568 can be decoded by second decoder function 1514 as described with reference to FIG. 16.

In this way, a memory device can receive commands according to one standard to place it into a mode that enables alternate command data on a command-address bus to be decoded according to a second standard to execute operations in the memory device.

Figure 18A:
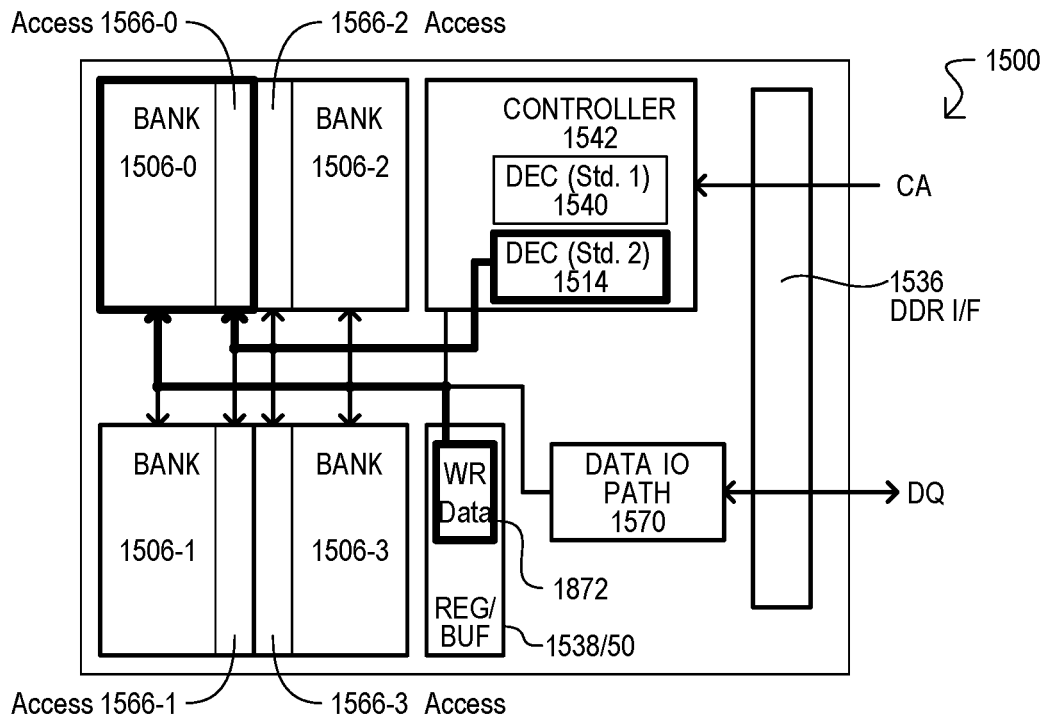
FIGS. 18A and 18B are diagrams showing the processing of program data in a memory device according to embodiments.
Figure 18B:
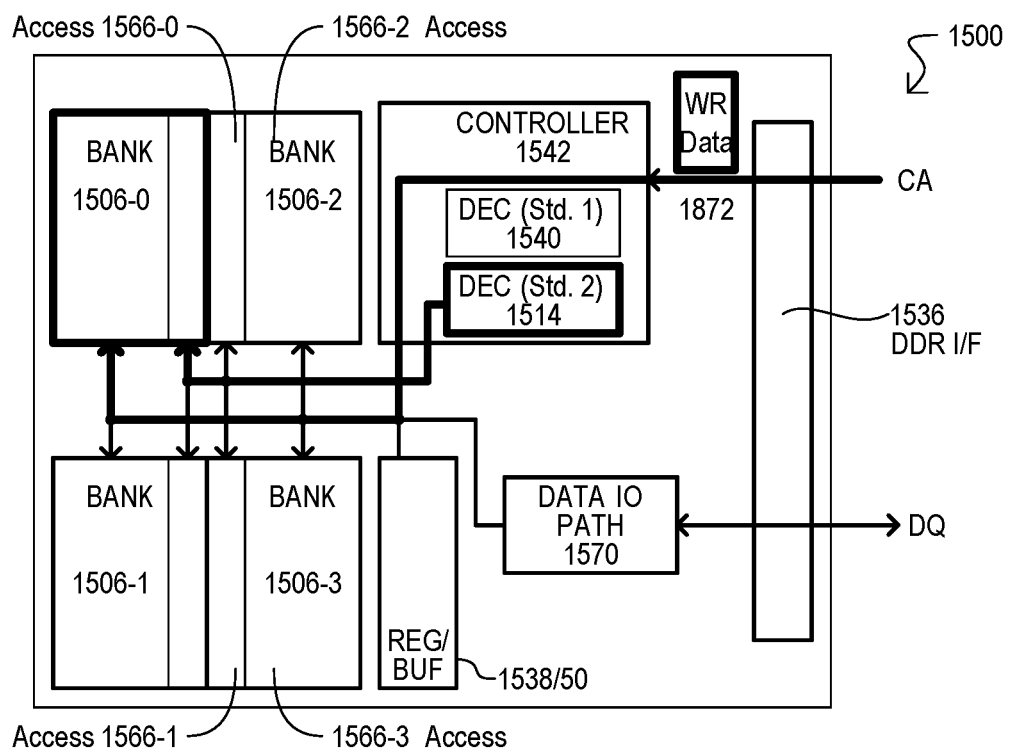

FIGS. 18A and 18B show the processing of program data in a memory device according to embodiments. FIG. 18A/B show a memory device 1500 like that of FIG. 15. However, banks (1506-0 to -3) are understood to include nonvolatile memory cells.

FIG. 18A shows how an alternate command can program write data 1872 previously stored in storage circuits into memory cells of a bank 1506-0. The operations of FIG. 18A can follow operations that decode alternate command data to determine a program operation is to take place. For example, the operations of FIG. 18A can follow those shown in FIG. 16. Such previous operations have resulted in write data 1872 being stored in storage circuits 1538/50. Such write data can be stored in a sequence of registers or included as a field in data packet stored in a buffer.

Second decoder operation 1514 can generate access signals that cause write data 1872 to be programmed at addresses indicated by alternate command data (not shown).

FIG. 18B shows how an alternate program write data 1872 are received over CA bus into memory cells of a bank 1506-0. The operations of FIG. 18B can follow operations that decoded alternate command data on the fly. For example, the operations of FIG. 18B can follow those shown in FIG. 17. Second decoder operation 1514 can generate access signals to enable write data 1872 arriving on CA bus to be programmed at addresses indicated by alternate command data (not shown).

In in this way, alternate command data (embedded operations) can be used to program data into nonvolatile memory cells of a memory device.

Figure 19A:
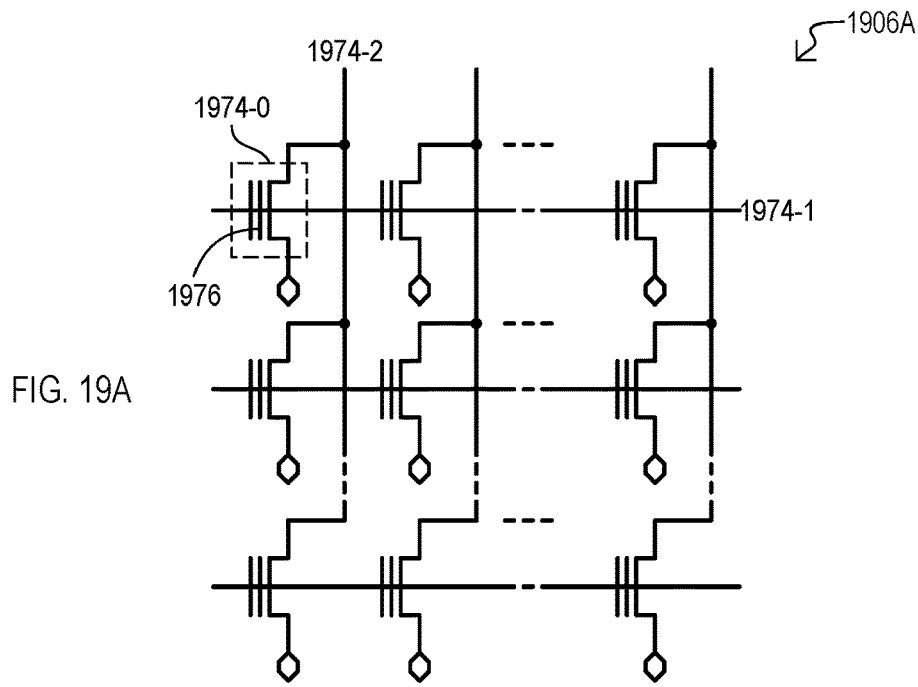
FIGS. 19A and 19B are diagrams of memory cell arrays that can be included in embodiments.

While embodiments can include any suitable memory cell array structure, some embodiments can include 1-transistor (1T) NOR type arrays. FIG. 19A is a schematic diagram of a 1T NOR array 1906A that can be included in embodiments. Array 1906A can include memory cells (one shown as 1974-0) arranged into rows and columns, with memory cells of a same row being connected to a same word line (one shown as 1974-1) and memory cells of a same column being connected to a same bit line (one shown as 1974-2). In some embodiments, memory cells (1974-0) can be formed with a single transistor structure, having a charge storing structure 1976 between a control gate and a channel. A charge storing structure 1976 can store one or more bits of data as charge (including absence of charge). A charge storing structure 1976 can take any suitable form including but not limited to: a floating gate, a charge storing dielectric (e.g., replacement gate), or a combination thereof.

Figure 19B:
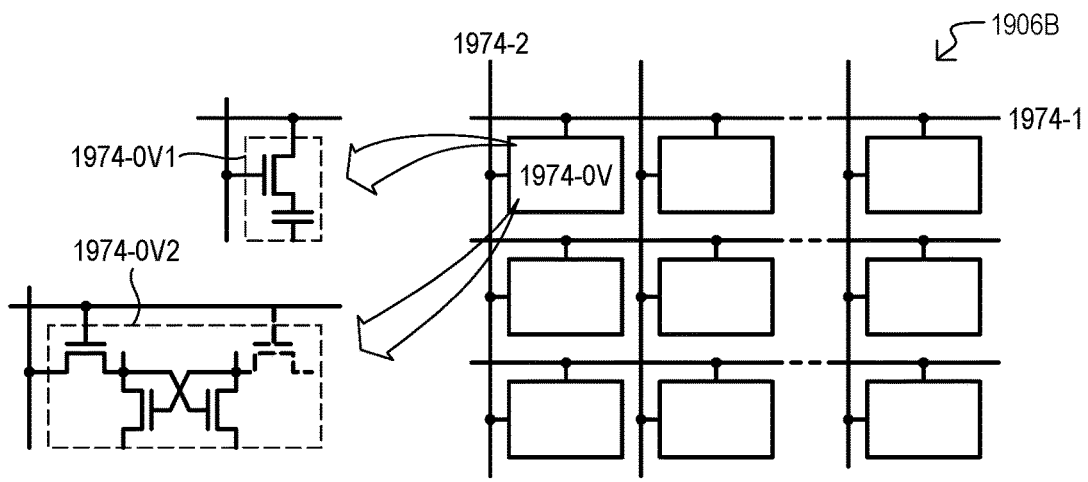

While embodiments can include nonvolatile memory cells, embodiments can also include any suitable volatile array structure or volatile memory cell type. FIG. 19B is a schematic diagram of possible volatile memory cells arrays that can be included in embodiments. FIG. 19B shows an array 1906B that can include volatile memory cells (one shown as 1974-0V) arranged into rows and columns and connected to one or more bit lines (e.g., 1974-2) and word lines (e.g., 1974-1). Volatile memory cells can take any suitable form, including but not limited to DRAM cells 1974-0V1 and/or SRAM cells 1974-0V2. SRAM cells 1974-0V2 can include, but are not limited to, 4-transistor (4T), 6T and/or 8T variations.

Of course, other embodiments can include any other suitable volatile or nonvolatile cell type and/or array architecture.

While embodiments can include systems with memory devices operating in conjunction with a host device, embodiments can also include standalone memory devices. Such devices can provide memory device operations according to two standards (e.g., LPDDR4 and SPI), but include an interface according to only one standard (e.g., LPDDR4). This can provide for a memory device with desirable feature but with a reduced pin count (e.g., no SPI interface). Such an embodiment is shown in FIG. 20.

Figure 20:
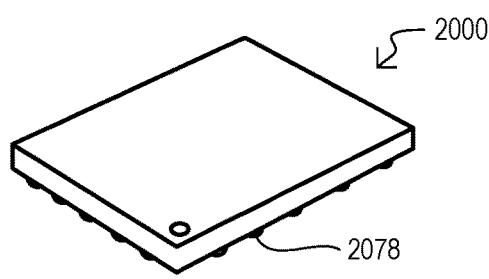
FIG. 20 is a diagram of an integrated circuit device according to an embodiment.

FIG. 20 shows a packaged memory device 2000 in a perspective top view. Memory device 2000 can take the form of any of those described herein, or equivalents. In some embodiments, memory device 2000 can include a single integrated circuit die. Memory device 2000 can include a number of physical connections (e.g., pins), one shown as 2078.

In this way, a memory device can provide functions according to two different standards (e.g., SPI and LPDDR4), but include connections for only one type of standard (LPDDR4) for a relatively low pin count.

Figure 21:
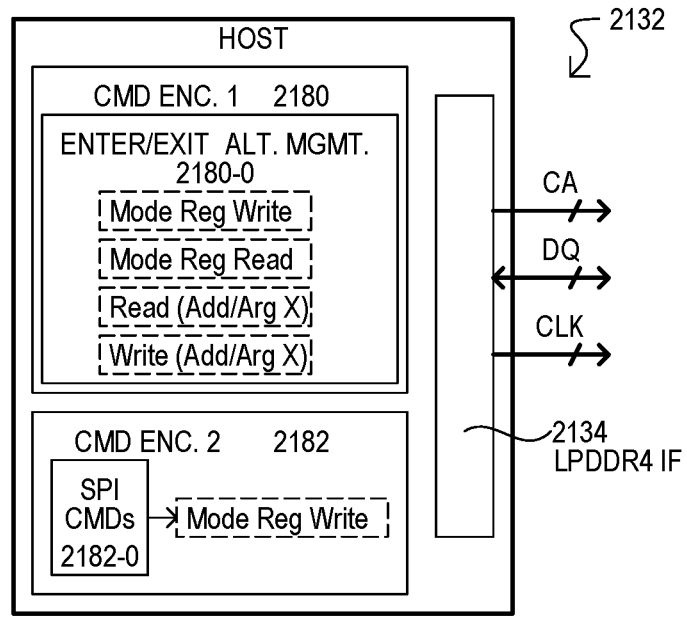
FIG. 21 is a block diagram of a host device according to an embodiment.

FIG. 21 is a block diagram of a host device 2132 according to an embodiment. A host device 2132 can enable operations to be executed according to two different standards by embedding any suitable functionality for controlling a memory device (e.g., array read, array write, register read, register write) into command sequences of another standard (e.g., LPDDR4). A host device 2132 can include a LPDDR4 interface 2134, a first command encoding function 2180 and a second command encoding function 2182. Such command encoding functions 2180/82 can be implemented in any suitable fashion, including but not limited to: a processor executing instructions, custom logic, programmable logic, or combinations thereof.

First encoding function 2180 can encode commands according to a first standard (LPDDR4). First encoding function 2180 can encode memory access requests (array read, array write, register read, register write) into memory access command in a conventional fashion. In addition, first encoding function 2180 can encode requests to enter and exit an alternate mode 2180-0. Such requests can take the form of any of those described herein, or equivalents, including a special MRW commands, special MRR commands, special array read or array write commands, or MPCs. Such commands can be special in that they can include additional data (arguments, addresses) not corresponding to commands according to the first standard.

Second encoding function 2182 can encode commands according to a second standard 2182-0 into formats compatible with the first standard. In some embodiments, such encoding can provide functions of an existing standard (e.g., SPI). For example, such formats can be bit value included in commands according to the second standard (e.g., bit values in mode register write commands).

In this way, a host device can embed commands of one standard into commands of another standard (provide embedded operations).

Figure 22:
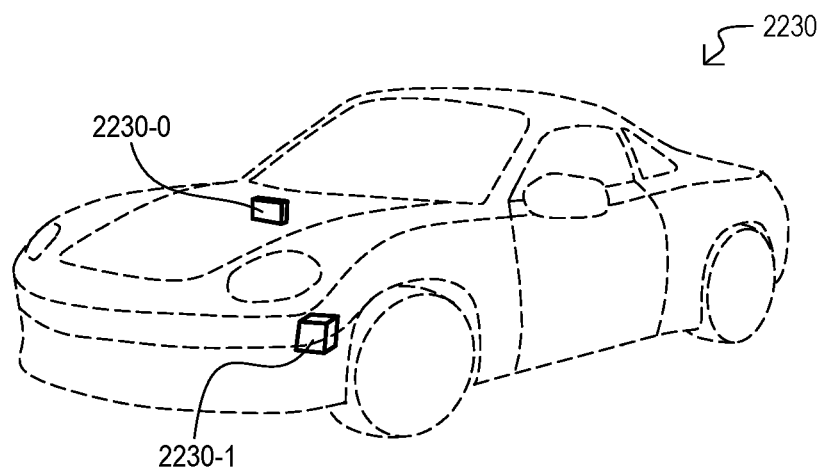
FIG. 22 is a diagram of an automobile system according to an embodiment.

Referring to FIG. 22 an automobile system 2230 according to an embodiment is shown in a diagram. An automobile system 2230 can have numerous sub-systems (two shown as 2230-0 and 2230-1). Sub-systems 2230-0/1 can operate with host devices (e.g., CPU subsystems) that communicate with one or more memory devices. Such sub-systems 2230-0/1 can include an electronic control unit (ECU) and/or an advanced driver assistance system (ADAS). However, in other embodiments such sub-systems can include a dashboard display/control sub-system and/or an infotainment sub-system, as but two of numerous possible examples A subsystem 2230-0/1 can include a host device that can access memory devices using embedded functions as described herein or equivalents. In some embodiments, such memory devices can be nonvolatile memory devices accessed by a host device over an LPDDR4 bus. Embedded functions can include nonvolatile memory functions such as SPI compatible program functions. According to embodiments, such embedded functions can be performed without the need for write training, enabling a rapid response to power-on timing requirement, such as those needed by CAN (and CAN-like) buses.

In this way, automobile systems can be provided with fast boot capabilities from nonvolatile memory device.

While the various devices and systems have disclosed methods, additional methods will now be described with reference to flow diagrams. Such methods are executable by processors executing instructions, custom logic, programmable logic, and combinations thereof. Such methods can be executable by the various devices described herein and equivalents.

Figure 23:
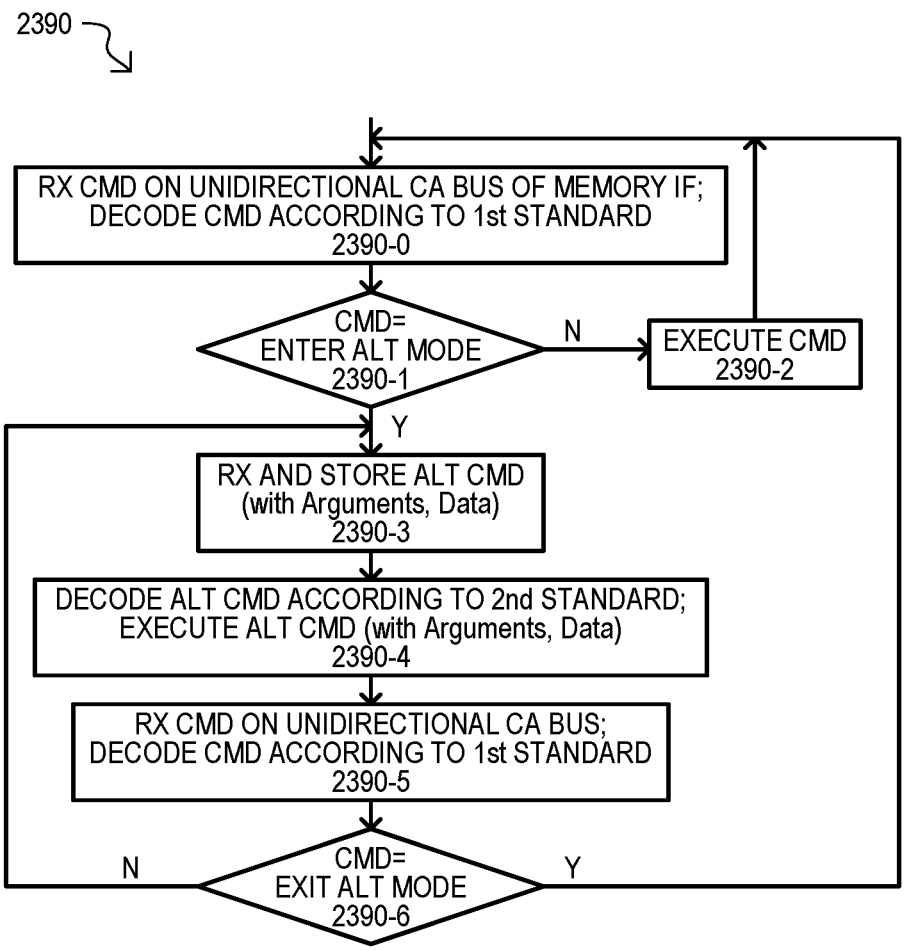
FIG. 23 is a flow diagram of a method according to an embodiment.

FIG. 23 shows a method 2390 for providing embedded operations according to an embodiment. A method 2390 can include receiving a command on a unidirectional CA bus of a memory interface. The received command can be decoded according to a first standard 2390-0. If a decoded command does not indicate an alternate mode (N from 2390-1), the command can be executed according to the first standard 2390-2.

If a decoded command indicates an alternate mode (Y from 2930-1), one or more alternate commands can be received and stored 2390-3. Such an action can include storing alternate commands with corresponding data (e.g., arguments, addresses). Alternate commands can be decoded according to a second standard and executed 2390-4. Such an action can include accessing the alternate command from a storage location, including any accompanying data.

A method 2390 can include receiving a command on the CA bus of the memory interface. The received command can be decoded according to a first standard 2390-5. If a decoded command does not indicate exiting an alternate mode (N from 2390-6), a method 2390 can continue to receive and execute alternate commands (return to 2390-3).

If a decoded command indicates exiting an alternate mode (Y from 2390-6), a method can return to receiving commands on the CA bus 2390-0.

In this way, commands according to a first command can place a device into an alternate mode in which it can receive and decode alternate commands according to a second standard.

Figure 24:
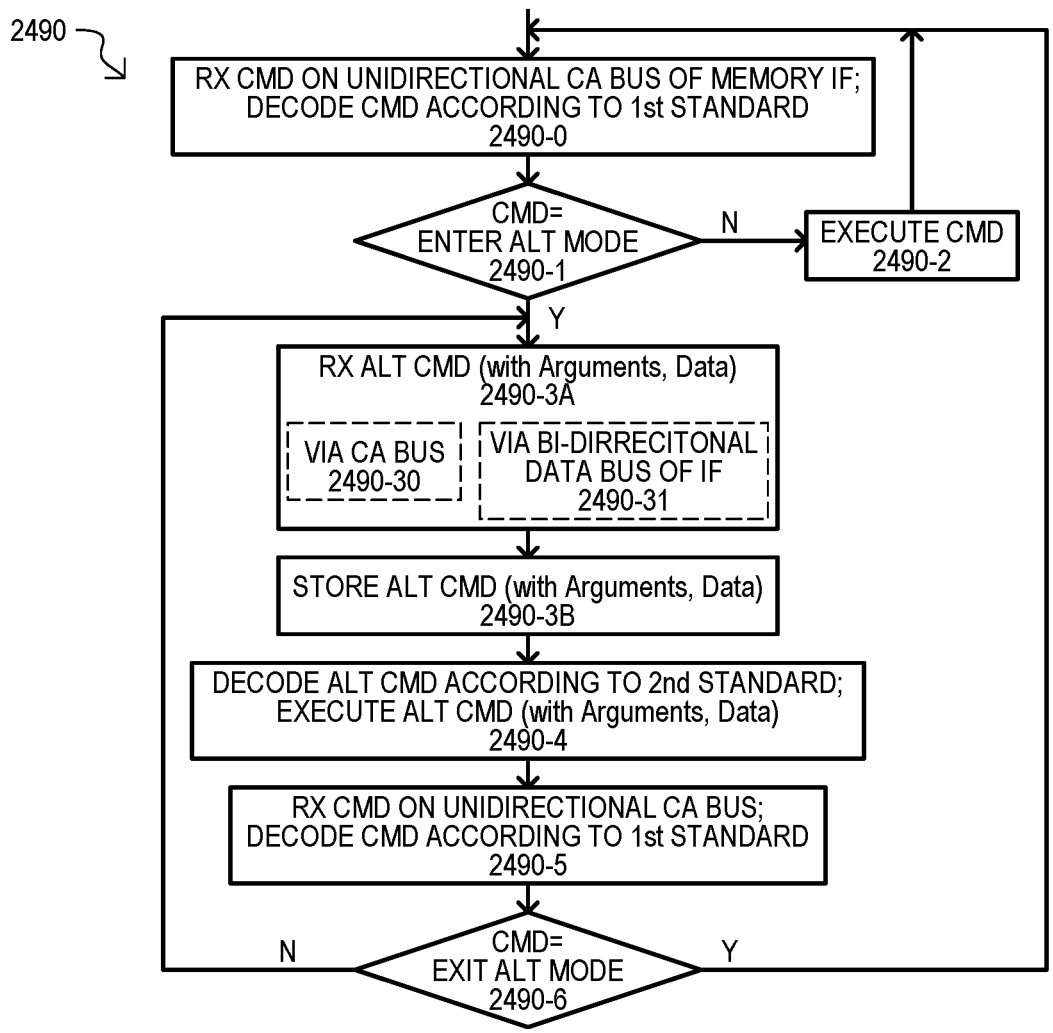
FIG. 24 is a flow diagram of a method according to another embodiment.

FIG. 24 shows a method 2490 for providing embedded operations according to a further embodiment. A method 2490 can include actions like those of FIG. 23. A method 2490 can differ that of FIG. 23 in that receiving an alternate command 2490-3A can include an alternate command over the CA bus 2490-30 and/or receiving an alternate command over a bidirectional data bus of the memory interface 2490-1.

In this way, commands according to a first standard can place a device into an alternate mode in which it can store alternate commands according to a second standard that are received over a unidirectional CA bus or bidirectional DQ bus.

Figure 25:
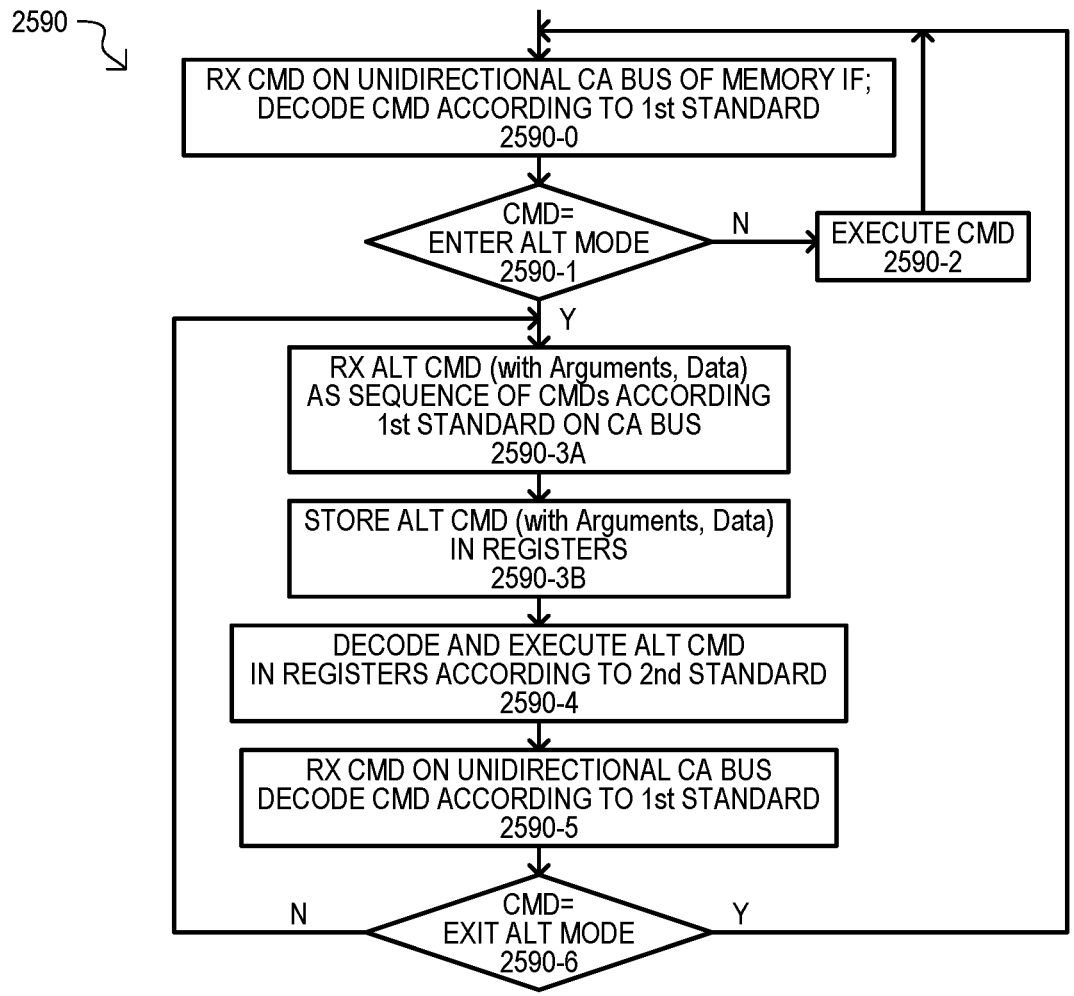
FIG. 25 is a flow diagram of a method according to a further embodiment.

FIG. 25 shows a method 2590 for providing embedded operations according to another embodiment. A method 2490 can include actions like those of FIG. 23. A method 2590 can differ that of FIG. 23 in that receiving an alternate command can include receiving the alternate command as a sequence of commands according to a first standard 2590-3A. Such an action can include receiving alternate command bit values (and any associated data) being embedded within commands according to the first standard (e.g., argument bits of the first standard commands).

Such alternate command values can be stored in registers 2590-3B. Such registers can include registers accessible according to the first standard and/or additional registers not used in the first standard, but used in the alternate mode.

In this way, commands according to a second standard can be included in commands according to a first standard.

Figure 26:
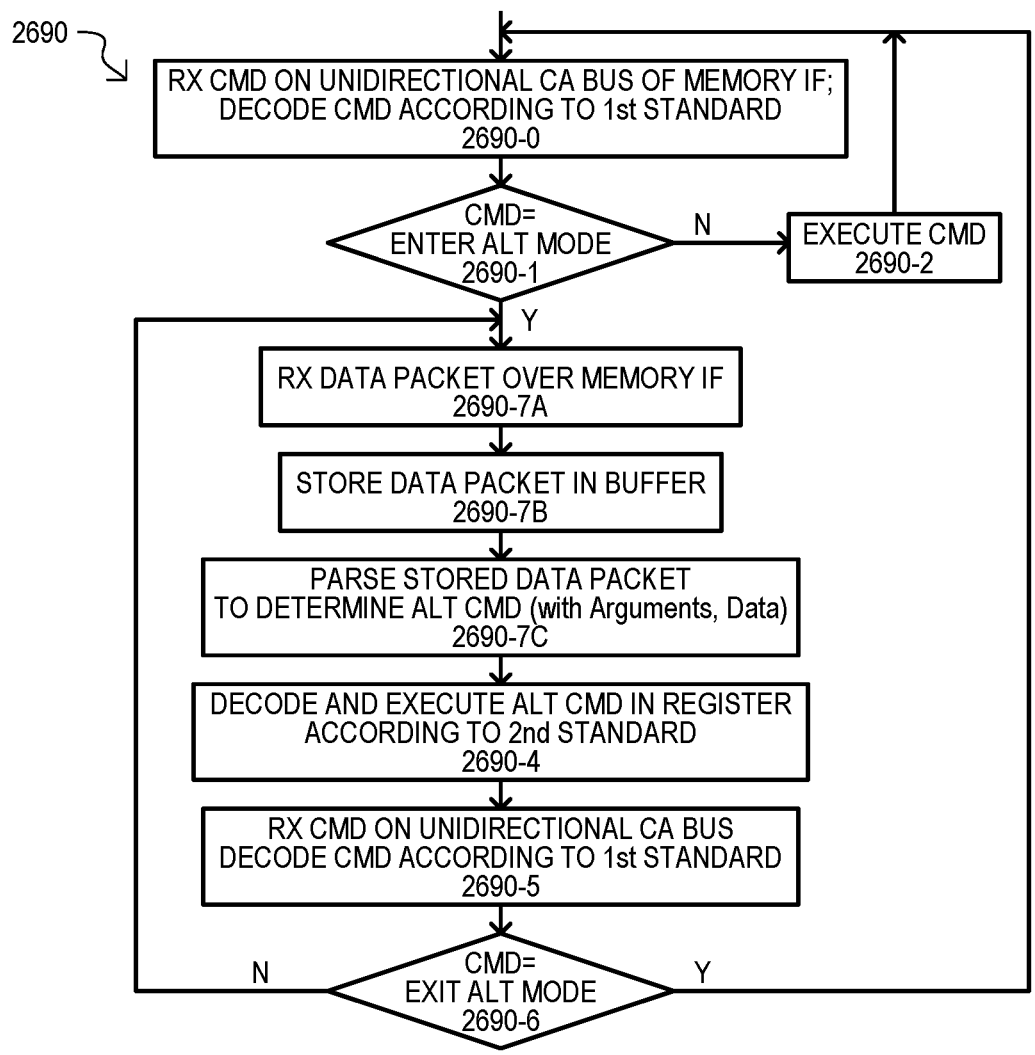
FIG. 26 is a flow diagram of a method according to another embodiment.

FIG. 26 shows a method 2690 for providing embedded operations according to another embodiment. A method 2690 can include actions like those of FIG. 23. A method 2690 can differ that of FIG. 23 in that once a first standard command has indicated an alternate mode (Y from 260-1), a method 2690 can receive a data packet over the memory interface 2690-7A. Such an action can include receiving packet data over CA bus and/or a DQ bus. Received packet data can be stored in a buffer 2690-7B. Such an action can include storing packet data in a buffer with a sequence of buffer write operations or storing the packet in registers with a sequence of register write transactions.

Stored packet data can be parsed to determine the alternate command 2690-7C. Such an action can include accessing stored packet data, with a storage location indicating the type of data stored (command, argument, address, data).

In this way, commands according to a first standard can place a device into an alternate mode in which it can receive a data packet that includes alternate command data.

Figure 27:
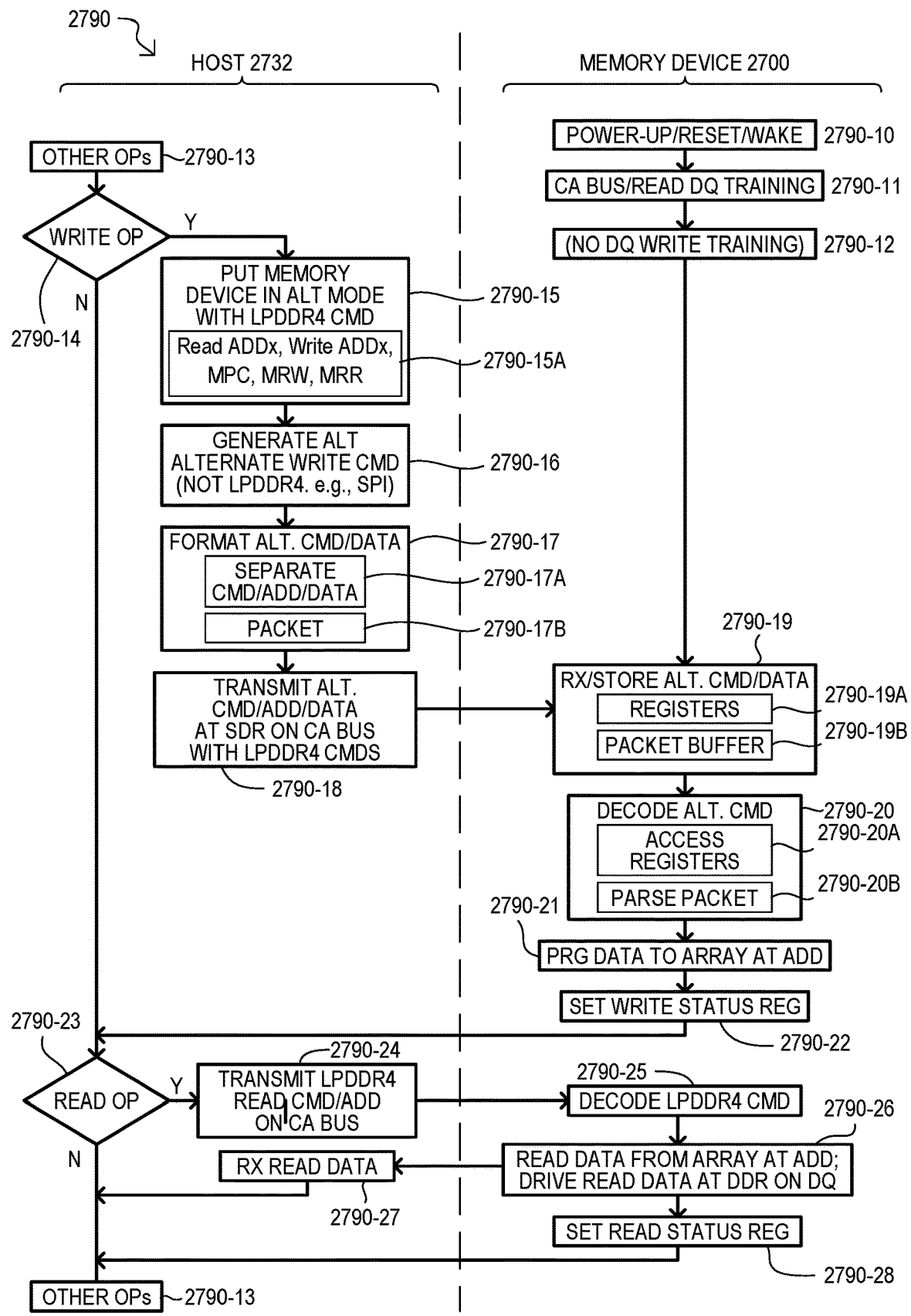
FIG. 27 is a flow diagram of a method according to another embodiment.

FIG. 27 is a diagram 2790 of a command processing method according to an embodiment. FIG. 27 shows actions for a host device 2732 and a memory device 2700. A method 2790 can include a memory device powering-up, resetting, waking, or a similar action 2790-10. Such an action can include a memory device 2790-10 receiving power, a command or predetermined signal. A memory device can execute CA bus training and read training (e.g., Read-DQ training) 2790-11. However, a memory device 2700 will not execute write training 2790-12. Consequently, a memory device 2700 can be ready for accesses without having to consume the time involved in write training.

A host device 2732 can execute various operations 2790-13. Such an action can include generating LPDDR4 compatible commands in response to system requests that are not write operations to memory device 2700. In response to receiving a write operation request (Y from 2790-14), a host device can place the memory device into an alternate mode with a LPDDR4 command 2790-15. Such an action can include any suitable LPDDR4 command with arguments that signify the alternate mode, including but not limited to: a special array read (Read ADDx), special array write (Write ADDx), MPC, MRW or MRR) 2790-15A.

A host device 2732 can generate an alternate write command 2790-16. Such an alternate command can be a command that is not compatible with an LPDDR4 standard. As but one example, such a command can equivalent to a SPI program command. A host device 2732 can format the alternate command (and any associated data) 2790-17. Such an action can include the bit values for the alternate command (and associated data) within one or more LPDDR4 commands (e.g., arguments of LPDDR4 commands) 2790-17A or within a data packet 2790-17B.

A host device 2732 can transmit alternate command data on a CA bus at a single data rate with LPDDR4 commands 2790-18.

A memory device 2700 can receive and store alternate command data 2790-19. Such an action can include storing alternate command data in registers 2790-19A or a packet buffer 2790-19B. Once stored, alternate command data can be decoded according to a second (i.e., not LPDDR4) standard 2790-20 to derive the program command. Such an action can include accessing registers 2790-20A, with knowledge of which registers store which data. Such an action can also include parsing received packet data 2720-20B.

Upon decoding the alternate command, write data can be programmed into an array at an address indicated by the alternate command 2790-21. According to the result of such a program operation, a write status register can be set 2790-22. Such a register can be read by a host device (not shown).

Method 2790 also shows a response to a read operation request. In some embodiments, such a read request can be preceded by an LPDDR4 command from a host that exits the alternate mode (not shown).

If a read operation request is received (Y from 2790-23), a host 2732 can transmit an LPDDR4 read command on a CA bus 2790-24. Such a read command can include a read address. A memory device 2700 can decode the LPDDR4 command 2790-25. Data can be read from an array at an address indicated by the read command, and such read data can be driven at a double data rate on a DQ bus 2790-26. Such read data can be received by a host device 2790-27. According to the result of such a read operation, a read status register can be set 2790-28. Such a register can be read by a host device (not shown).

In this way, a host device 2732 can embed non-LPDDR4 program commands into LPDDR4 commands and transmit such program commands over a CA bus to a memory device 2700. The memory device 2700 can decode the program command an execute a program operation.

Embodiments can include a method wherein, in a default mode of a memory device command data received on a unidirectional CA can be decoded according to a first standard. In response to decoding a mode enter command with the first decoding standard, the memory device can be placed into an alternate management mode. In the alternate management mode, alternate command data can be received on the CA bus. In response to receiving a command execution indication on the CA bus, the alternate command data can be decoded according to a second standard to execute an alternate command. In response to decoding a mode exit command received on the CA bus according to the first standard, the memory device can be returned to the default mode. The CA bus and the data bus can include a plurality of parallel input connections.

Embodiments can include a memory device having at least one nonvolatile memory cell array; an interface that includes a unidirectional CA bus comprising a plurality of CA inputs, a data bus comprising a plurality of data input/outputs (IOs), and a timing clock input. A memory device can further include memory controller circuits configured to, in a default mode of operation decode command data received on the CA bus according to a first standard, and in response to decoding a mode enter command according to the first standard, placing the memory device into an alternate management mode. In the alternate management mode, the memory controller circuits can receive alternate command data on the CA bus, and, in response to receiving a command execution indication on the CA bus, decode the alternate command data according to a second standard to execute an alternate command. In response to decoding a mode exit command received on the CA bus with the first command decoding protocol, the memory controller circuits can return the memory device to the default mode.

Embodiments can include a system, comprising: a memory device that includes an interface with a unidirectional command address (CA) bus, a data bus, and a clock input configured to receive a clock. The memory device can further include memory controller circuits configured to, in a default mode of operation, decode command data received on the CA bus according to a first standard, and in response to decoding a mode enter command according to the first standard, place the memory device into an alternate management mode. In the alternate management mode, memory controller circuits can receive alternate command data on the CA bus, and, in response to receiving a command execution indication on the CA bus, decode the alternate command data to execute an alternate command. The first standard can include at least one read command that outputs read data stored in at least one memory cell array on the data bus at a double data rate with respect to the clock. At least one alternate command can include a write command that writes data in the at least one memory cell array, the write data received at a single data rate with respect to the clock on the CA bus.

Methods, devices and systems according to embodiments can be capable of reading data from the at least one memory cell array in both the default mode and the alternate mode.

Methods, devices and systems according to embodiments can include in the default mode, storing memory device configuration data in configuration registers. In the alternate management mode, the alternate command data can be stored in the configuration registers.

Methods, devices and systems according to embodiments can include, in the default mode, the configuration registers having a first register address space; and in the alternate management mode, the configuration registers have a second register address space greater than the first register address space.

Methods, devices and systems according to embodiments can include, in the alternate management mode, receiving alternate command data on the CA bus including; receiving a program command, program address and program data on the CA bus configured to program nonvolatile memory cells with write data, and executing the alternate command includes programming the write data at the program address.

Methods, devices and systems according to embodiments can include, in the alternate management mode, receiving alternate command data on the CA bus including receiving a register read command and register address on the CA bus configured to, and executing the alternate command includes providing register data the register address as output data on the data bus.

Methods, devices and systems according to embodiments can include, in the alternate management mode, receiving the alternate command data in at least one data packet, and in response to receiving the command execution indication, parsing the at least one data packet to access the alternate command data.

Methods, devices and systems according to embodiments can include the first standard being a double data rate (DDR) standard that transmits data on the data bus at a DDR, and receives command and address data at a single data rate; and the second standard enables the execution of commands having the functionality of a serial bus standard that transmits command, address and data values over at least one serial line.

Methods, devices and systems according to embodiments can include the first standard being a low power DDR standard; and the serial bus standard being a serial peripheral interface standard.

Methods, devices and systems according to embodiments can include a packet buffer circuit; and in the alternate management mode of operation, the controller circuits are configured to store a received data packet in the packet buffer circuit, and parse the data packet to determine the alternate command data.

Methods, devices and systems according to embodiments can include alternate command data including any selected from the group of: a length value indicating an amount of data stored by the data packet, an error detection or correction code for the data included in the data packet, and security value for authenticating a sender of the data packet.

Methods, devices and systems according to embodiments can include the data bus being unidirectional, providing output data from the device.

Methods, devices and systems according to embodiments can include the at least one memory cell array comprises nonvolatile memory cells; and the write command is configured to program data received on the CA bus into the at least one memory cell array.

Methods, devices and systems according to embodiments can include the at least one alternate command including a register write command configured to write data received on the CA bus into a register of the memory device, and a register read command configured to output data stored in a register of the memory device on the data bus. The register of the memory device can be different from the at least one memory array.

Methods, devices and systems according to embodiments can include a plurality of registers different from a memory cell array. The memory cell array can comprise nonvolatile memory cells. In the alternate management mode, memory controller circuits are configured to execute register write commands decoded according to the first standard to store an alternate program command and write data into the registers, and decode the alternate write command according to the second standard to program the write data into the nonvolatile memory cells.

Methods, devices and systems according to embodiments can include a packet buffer circuit different from the at least one memory cell array. The at least one memory cell array can comprise nonvolatile memory cells. In the alternate management mode, the memory controller circuits are further configured to store packet data received at the interface in the packet buffer circuit, parse the stored packet data to determine alternate write command and write data, and decode the alternate write command according to the second standard to program the write data into the nonvolatile memory cells.

Methods, devices and systems according to embodiments can include the packet buffer circuit comprising volatile memory cells.

Methods, devices and systems according to embodiments can include the first standard being compatible with a DDR standard; and a host device coupled to the memory device by a memory bus. The host device can be configured to generate alternate command data that provide the same functionality as a serial interface standard.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of exemplary embodiments of the invention, various features of the invention are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claims require more features than are expressly recited in each claim. Rather, inventive aspects lie in less than all features of a single foregoing disclosed embodiment. Thus, the claims following the detailed description are hereby expressly incorporated into this detailed description, with each claim standing on its own as a separate embodiment of this invention.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method, comprising:
   in a default mode of a memory device:
      decoding command data received on a unidirectional command address (CA) bus of a memory interface according to a first standard, and,
      in response to decoding a mode enter command with the first standard, placing the memory device into an alternate management mode; and
   in the alternate management mode:
      receiving alternate command data on the CA bus, including at least a program command, program address and program data configured to program nonvolatile memory cells with the program data, in response to receiving a command execution indication on the CA bus, decoding the alternate command data according to a second standard to execute an alternate command, including at least programming the program data at the program address, and in response to decoding a mode exit command received on the CA bus as alternate command data and according to the first standard, returning the memory device to the default mode; wherein the memory interface comprises the CA bus and a data bus, and the CA bus and data bus comprise a plurality of parallel input connections.

2. The method of claim 1, wherein:
in the default mode, storing memory device configuration data in configuration registers; and
in the alternate management mode,
storing the alternate command data in the configuration registers.

3. The method of claim 2, wherein:
in the default mode, the configuration registers have a first register address space; and
in the alternate management mode the configuration registers have a second register address space greater than the first register address space.

4. The method of claim 1, wherein:
in the alternate management mode, receiving alternate command data on the CA bus includes
receiving a register read command and a register address on the CA bus, and
executing the alternate command includes providing register data at the register address as output data on the data bus.

5. The method of claim 1, wherein:
in the alternate management mode,
receiving the alternate command data in at least one data packet, and
in response to receiving the command execution indication, parsing the at least one data packet to access the alternate command data.

6. The method of claim 1, wherein:
the first standard is a double data rate (DDR) standard that transmits data on the data bus at a DDR, and receives command and address data at a single data rate; and
the second standard enables the execution of commands having the functionality of a serial bus standard that transmits command, address and data values over at least one serial line.

7. The method of claim 6, wherein:
the first standard is a low power DDR standard; and
the serial bus standard is a serial peripheral interface standard.

8. A memory device, comprising:
at least one nonvolatile memory cell array;
an interface that includes a unidirectional command address (CA) bus comprising a plurality of CA inputs, a data bus comprising a plurality of data input/outputs (IOs), and a timing clock input;
memory controller circuits configured to
in a default mode of operation
decode command data received on the CA bus according to a first standard, and
in response to decoding a mode enter command according to the first standard, placing the memory device into an alternate management mode; and
in the alternate management mode:
receive alternate command data on the CA bus,
in response to receiving a command execution indication on the CA bus, and
decode the alternate command data according to a second standard to execute an alternate command, and
in response to decoding a mode exit command received on the CA bus as alternate command data and with the first standard, returning the memory device to the default mode; wherein
the data bus is unidirectional providing read-only output data from the device.

9. The memory device of claim 8, wherein:
the first standard is compatible with at least one double data rate standard; and
the second standard enables the execution of commands having the functionality of at least one serial data communications standard.

10. The device of claim 8, further including:
a plurality of mode registers; and
the controller circuits are configured to
in the default mode of operation, store mode configuration values in the mode registers in response to decoding mode access commands according to the first standard, and
in the alternate management mode of operation, store the alternate command data in the mode registers.

11. The device of claim 8, further including:
a packet buffer circuit; and
in the alternate management mode of operation, the memory controller circuits are configured to store a received data packet in the packet buffer circuit, and parse the data packet to determine the alternate command data.

12. The device of claim 11, wherein:
in the alternate command data includes any selected from the group of: a length value indicating an amount of data stored by the data packet, an error detection or correction code for the data included in the data packet, and security value for authenticating a sender of the data packet.

13. The device of claim 8, wherein:
the alternate command data comprises a program command, a target address and data to program.

14. A system, comprising:
a memory device that includes
an interface with a unidirectional command address (CA) bus, a data bus, and a clock input configured to receive a clock;
memory controller circuits configured to
in a default mode of operation, decode command data received on the CA bus according to a first standard, and
in response to decoding a mode enter command according to the first standard, place the memory device into an alternate management mode; and
in the alternate management mode,
receive alternate command data on the CA bus,
in response to receiving a command execution indication on the CA bus, decode the alternate command data to execute an alternate command; wherein
the first standard includes at least one read command that outputs read data stored in at least one memory cell array on the data bus at a double data rate with respect to the clock, and
at least one alternate command includes a write command that writes data in the at least one memory cell array, the write data received at a single data rate with respect to the clock on the CA bus.

15. The system of claim 14, wherein:
the at least one memory cell array comprises nonvolatile memory cells; and
the write command is configured to program data received on the CA bus into the at least the at least one memory cell array.

16. The system of claim 14, wherein:
the at least one alternate command further includes
  a register write command configured to write data received on the CA bus into a register of the memory device, and
  a register read command configured to output data stored in a register of the memory device on the data bus; wherein
the register of the memory device is different from the at least one memory array.

17. The system of claim 14, further including:
a plurality of registers different from the at least one memory cell array;
the at least one memory cell array comprises nonvolatile memory cells; and
in the alternate management mode the memory controller circuits are further configured to
  execute register write commands decoded according to the first standard to store an alternate program command and write data into the registers, and
  decode the alternate write command according to the second standard to program the write data into the nonvolatile memory cells.

18. The system of claim 14, further including:
a packet buffer circuit different from the at least one memory cell array; and
the at least one memory cell array comprises nonvolatile memory cells; and
in the alternate management mode the memory controller circuits are further configured to
  store packet data received at the interface in the packet buffer circuit,
  parse the stored packet data to determine alternate write command and write data, and
  decode the alternate write command according to the second standard to program the write data into the nonvolatile memory cells.

19. The system of claim 18, wherein:
the packet buffer circuit comprises volatile memory cells.

20. The system of claim 14, further including:
the first standard is compatible with a double data rate (DDR) standard; and
a host device coupled to the memory device by a memory bus, the host device configured to generate alternate command data that provide the same functionality as a serial interface standard.

* * * * *